(12) United States Patent
Villarreal et al.

(10) Patent No.: US 11,623,411 B2
(45) Date of Patent: Apr. 11, 2023

(54) COSMETIC CONTAINERS AND METHODS OF MANUFACTURE

(71) Applicant: HCT GROUP HOLDINGS LIMITED, Sheung Wan (CN)

(72) Inventors: Armando Villarreal, Los Angeles, CA (US); Thomas Sang Chun, Buena Park, CA (US); Denis Pierre Maurin, Los Angeles, CA (US)

(73) Assignee: HCT GROUP HOLDINGS LIMITED, Sheung Wan (HK)

( * ) Notice: Subject to any disclaimer, the term of this patent is extended or adjusted under 35 U.S.C. 154(b) by 0 days.

(21) Appl. No.: 17/404,724

(22) Filed: Aug. 17, 2021

(65) Prior Publication Data

US 2022/0055315 A1 Feb. 24, 2022

Related U.S. Application Data

(60) Provisional application No. 63/067,105, filed on Aug. 18, 2020.

(51) Int. Cl.
| | |
|---|---|
| *B29C 65/72* | (2006.01) |
| *A45D 34/04* | (2006.01) |
| *B29C 65/66* | (2006.01) |
| *B29C 65/00* | (2006.01) |
| *B29C 65/34* | (2006.01) |
| *B29L 31/00* | (2006.01) |

(52) U.S. Cl.
CPC .............. *B29C 65/72* (2013.01); *A45D 34/04* (2013.01); *B29C 65/3444* (2013.01); *B29C 65/66* (2013.01); *B29C 66/5344* (2013.01); *A45D 2200/05* (2013.01); *B29L 2031/7158* (2013.01)

(58) Field of Classification Search
CPC . B29L 2031/7158; B29C 66/63; B29C 65/66; B29C 66/542
See application file for complete search history.

(56) References Cited

U.S. PATENT DOCUMENTS

| | | | | |
|---|---|---|---|---|
| 3,303,255 | A * | 2/1967 | Bracey, Jr. | B29C 65/18 264/249 |
| 3,399,291 | A * | 8/1968 | Limbach | B29C 66/12461 219/243 |
| 3,438,824 | A * | 4/1969 | Balamuth | B29C 66/8322 156/580.2 |
| 3,690,088 | A * | 9/1972 | Anderson | B29C 66/43123 53/329.2 |

(Continued)

FOREIGN PATENT DOCUMENTS

| | | |
|---|---|---|
| KR | 20120139487 A | 12/2012 |
| KR | 101292166 B1 | 8/2013 |

OTHER PUBLICATIONS

International Search Report and Written Opinion dated Nov. 30, 2021 for International Application No. PCT/US2021/046338.

*Primary Examiner* — Michael W Hotchkiss
(74) *Attorney, Agent, or Firm* — Seager, Tufte & Wickhem LLP

(57) ABSTRACT

Methods of manufacturing and fixtures for manufacturing containers, particularly for holding cosmetic products, using thin-walled tubes. One end of a container may be formed using an integral process, such as insert molding, while the other end of the container is formed using assembly steps, such as welding, to form a completed cosmetics container from a thin-walled tube.

12 Claims, 30 Drawing Sheets

(56) References Cited

U.S. PATENT DOCUMENTS

| | | | | |
|---|---|---|---|---|
| 3,727,022 | A * | 4/1973 | Hamilton | B29C 66/81261 219/633 |
| 3,734,393 | A * | 5/1973 | Stump | B65D 3/10 229/5.5 |
| 3,902,617 | A * | 9/1975 | Valyi | B29C 49/22 215/901 |
| 4,035,926 | A * | 7/1977 | Farfaglia | B29C 65/10 34/104 |
| 4,127,059 | A * | 11/1978 | Richards | B29C 66/545 493/158 |
| 4,337,104 | A * | 6/1982 | Lynn | C12M 25/06 435/298.2 |
| 4,355,759 | A * | 10/1982 | Amberg | B65D 15/08 229/5.5 |
| 4,394,209 | A * | 7/1983 | Kolb | B29C 66/112 156/580.2 |
| 4,402,451 | A * | 9/1983 | Woerz | B65D 15/08 229/5.5 |
| 4,469,547 | A * | 9/1984 | Mitchell | B29C 66/8322 156/497 |
| 4,527,699 | A * | 7/1985 | Namba | B65D 15/22 220/613 |
| 4,531,930 | A * | 7/1985 | Clauss | B65D 3/30 493/308 |
| 4,667,842 | A * | 5/1987 | Collins | B29C 66/1284 220/359.4 |
| 4,762,249 | A * | 8/1988 | Fortuna | B29C 66/12441 229/5.5 |
| 4,832,769 | A * | 5/1989 | Shantz | B29C 66/135 228/114.5 |
| 4,944,977 | A * | 7/1990 | Shantz | B29C 65/0672 428/35.8 |
| 4,962,862 | A * | 10/1990 | Farrington | B29C 66/542 220/613 |
| 5,165,566 | A * | 11/1992 | Linner | B29C 66/8322 220/613 |
| 5,244,106 | A * | 9/1993 | Takacs | B65D 23/12 220/744 |
| 5,348,698 | A | 9/1994 | Park et al. | |
| 5,524,778 | A * | 6/1996 | De Caluwe | B32B 27/18 40/310 |
| 9,156,223 | B2 * | 10/2015 | Stolzman | B65D 43/0231 |
| 2004/0135288 | A1 | 7/2004 | Tanaka et al. | |
| 2007/0240383 | A1 * | 10/2007 | Keller | B29C 66/543 53/373.7 |
| 2009/0061037 | A1 * | 3/2009 | Sander | B29C 66/542 220/613 |
| 2010/0059259 | A1 * | 3/2010 | Bessho | C23C 18/1653 216/13 |
| 2010/0059529 | A1 * | 3/2010 | Thomasset | B29C 66/1222 220/639 |
| 2011/0253713 | A1 * | 10/2011 | Ichikawa | B65D 11/06 220/288 |

\* cited by examiner

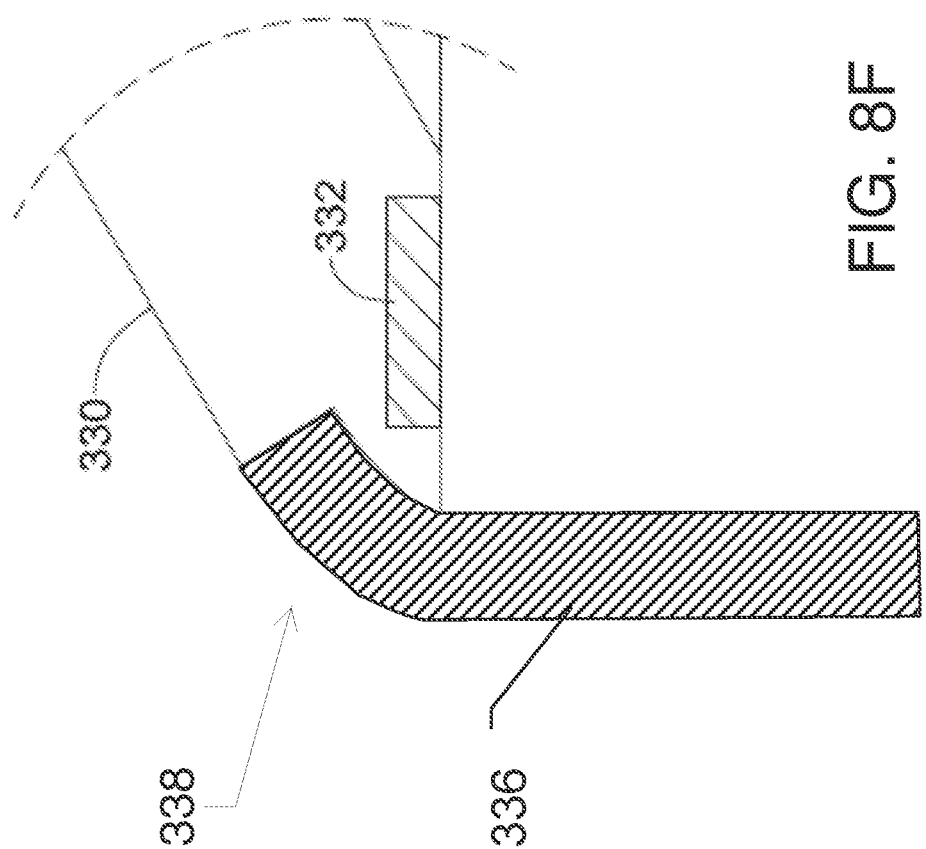

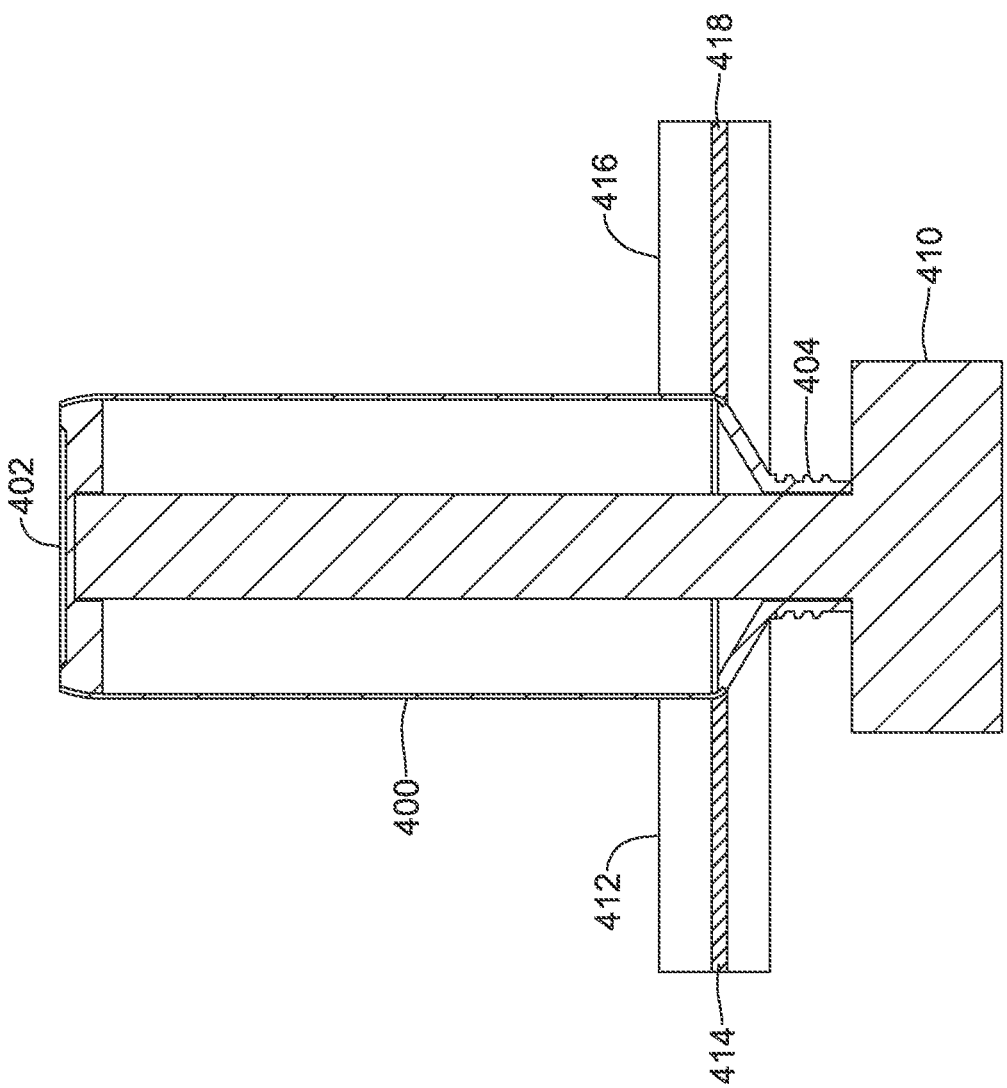

COSMETIC CONTAINERS AND METHODS OF MANUFACTURE

CROSS REFERENCE TO RELATED APPLICATIONS

The present application claims the benefit of and priority to U.S. Provisional Application No. 63/067,105, filed Aug. 18, 2020 and titled COSMETIC CONTAINERS AND METHODS OF MANUFACTURE, the disclosure of which is incorporated herein by reference.

TECHNOLOGY FIELD

The present application relates generally to a cosmetic container, and in particular, a cosmetic container with a capped seal, and to methods of manufacturing cosmetic containers.

BACKGROUND

Devices exist for holding cosmetic or medicinal products. Some such devices comprise a tubular shell or bottle for holding a product, and a cap for closing the tube or bottle. In the cosmetics and personal care industries, these devices are used for containing a product to be applied to a body. Exemplary products include liquids, creams, gels, and various makeup and skincare products such as foundation, concealer, lotion serum, petroleum products, moisturizer, sunscreen, etc. Many such containers are made by molding, such as blow molding, for example. Other constructions may start with an extruded tube and add a molded structure on one end adapted to receive an applicator and cap, leaving the other end open for filling with a cosmetic or medicinal product. Once the extruded tube has been filled with the product, the open end is typically crimped shut. The crimping process deforms the tubular shell which reduces the volume of the tubular shell, thereby effectively reducing the amount of product that can be contained, while also limiting how the filled container can be stored. Greater volume may be desirable, as well as alternative aesthetics and the ability to stand the container on its closed end. Accordingly, there remains a need for improved cosmetic containers and alternative manufacturing processes.

Overview

The present inventors have recognized, among other things, that a problem to be solved is the need for new and/or alternative designs and manufacturing methods for containers, including those adapted for use in containing cosmetic products.

A first illustrative, non-limiting example takes the form of a method of manufacturing a container using a thin-walled tube having a first open end and a second open end for said container, the method comprising: attaching a first structure on the first open end of the thin-walled tube, the first structure including a receiving portion for receiving a cap, and an aperture for dispensing a product; placing a mandrel through the aperture; placing an end cap piece against the mandrel such that at least a portion of the end cap piece is surrounded by the thin-walled tube; and securing the second open end of the thin-walled tube to the end cap piece by placing a weld fixture over the end cap and the second open end of the thin-walled tube and applying energy to the junction thereof.

Additionally or alternatively, the thin-walled tube is an extruded member.

Additionally or alternatively, the thin-walled tube has at least two layers.

Additionally or alternatively, the thin-walled tube is a laminate sheet having a weld seam to form the tube.

Additionally or alternatively, the thin-walled tube has at least three layers.

Additionally or alternatively, the mandrel has a central axis and is passed through the aperture in the direction of the central axis in the placing step, and further the weld fixture is placed by movement along the central axis of the mandrel.

Additionally or alternatively, the mandrel has a central axis and is passed through the aperture in the direction of the central axis in the placing step, and further the weld fixture is a multiple-piece fixture placed by movement perpendicular to the central axis.

Additionally or alternatively, the mandrel has a central axis and is passed through the aperture in the direction of the central axis in the placing step, and further the weld fixture is operated for welding by rotation at least partly about the central axis while in contact with at least one of the thin-walled tube or the end cap piece.

Additionally or alternatively, the end cap piece has a slot for receiving the mandrel therein.

Additionally or alternatively, the end cap piece has an outer wall against which the thin-walled tube is placed for welding, and the outer wall defines a receiving area with a ridge determining the end of the receiving area.

Additionally or alternatively, wherein the end cap piece has an outer wall against which the thin-walled tube is placed for welding, and is formed with a reinforcing ring made of a first material, and a molded piece surrounding the reinforcing ring made of a second material.

Additionally or alternatively, the end cap piece has an outer wall against which the thin-walled tube is placed for welding, the outer wall being made of a first piece of a first material, and the rest of the outer wall being made of a second piece of a second material.

Additionally or alternatively, the method further comprises resting the receiving portion on the mandrel.

Additionally or alternatively, the thin-walled tube comprises at least a portion made of a heat shrink material.

A second illustrative non-limiting example takes the form of a cosmetics container for holding a cosmetic material such as a cream, the container comprising: a thin-walled tube having a first open end and a second open end for said container; a first structure on the first open end of the thin-walled tube, the first structure including a receiving portion for receiving a cap, and an aperture for dispensing a product; and an end cap piece on the second open end of the thin-walled tube; wherein the container is made using a method as in the first illustrative, non-limiting example, or any of the above or below additional or alternative variations thereon.

A third illustrative non-limiting example takes the form of a method of manufacturing a container using a thin-walled tube having a first open end and a second open end for said container, the method comprising: inserting a pre-made dispenser into the thin-walled tube, the pre-made dispenser comprising an aperture surrounded by a neck, having a shoulder extending outward from the neck to an outermost circumference, the shoulder having an attachment portion thereon; and welding the thin-walled tube onto the attachment portion of the pre-made dispenser by applying pressure and heat against the attachment portion, thereby securing the pre-made dispenser to the first open end of the thin-walled tube.

Additionally or alternatively, the pre-made dispenser comprises outer threads on the neck, and the welding step is performed with the pre-made dispenser secured by the threads to a fixture, enabling the pressure to be applied.

Additionally or alternatively, the method further comprises, before welding the thin-walled tube to the pre-made dispenser, molding a sealed end cap on the second open end of the extruded tubular member.

A fourth illustrative and non-limiting example takes the form of a cosmetics container comprising a thin-walled tube having a first open end and a second open end and a pre-made dispenser having an aperture surrounded by a neck and a shoulder extending outward from the neck, the thin walled tube attached to the shoulder, manufactured using a method as the third illustrative and non-limiting example and the above or below additions or alternative variants thereof.

Still further illustrative and non-limiting examples take the form of cosmetics containers comprising a thin-walled tube having a first open end and a second open end, the first end attached to a dispenser adapted to hold a cap thereon, and the second end attached to an end cap, manufactured by any of the methods shown and described herein.

This overview is intended to provide an introduction to the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 8B-8F show several options for the illustrative neck piece of FIG. 8A;

FIGS. 9A-9B are section views of illustrative container manufacturing steps;

DETAILED DESCRIPTION

The following description discusses the manufacture of containers using a variety of methods each involving a thin-walled tube. In the cosmetics and personal care industries, such cosmetic containers are used for containing a product to be applied to a body. Exemplary products include liquids, creams, gels, suspensions, etc., usable as various makeup and skincare products such as foundation, concealer, lotion serum, petroleum products, moisturizer, soap, revitalizing or cooling-type lotion/cream, sunscreen, etc. As used herein, a container may refer to a generic container, while a cosmetic container refers to a container for use in the cosmetics and personal care industries, such as cosmetic containers adapted for use in containing the above listed products, which may incorporate materials inert to the above listed products for contacting and containing such products.

Figure 1A:
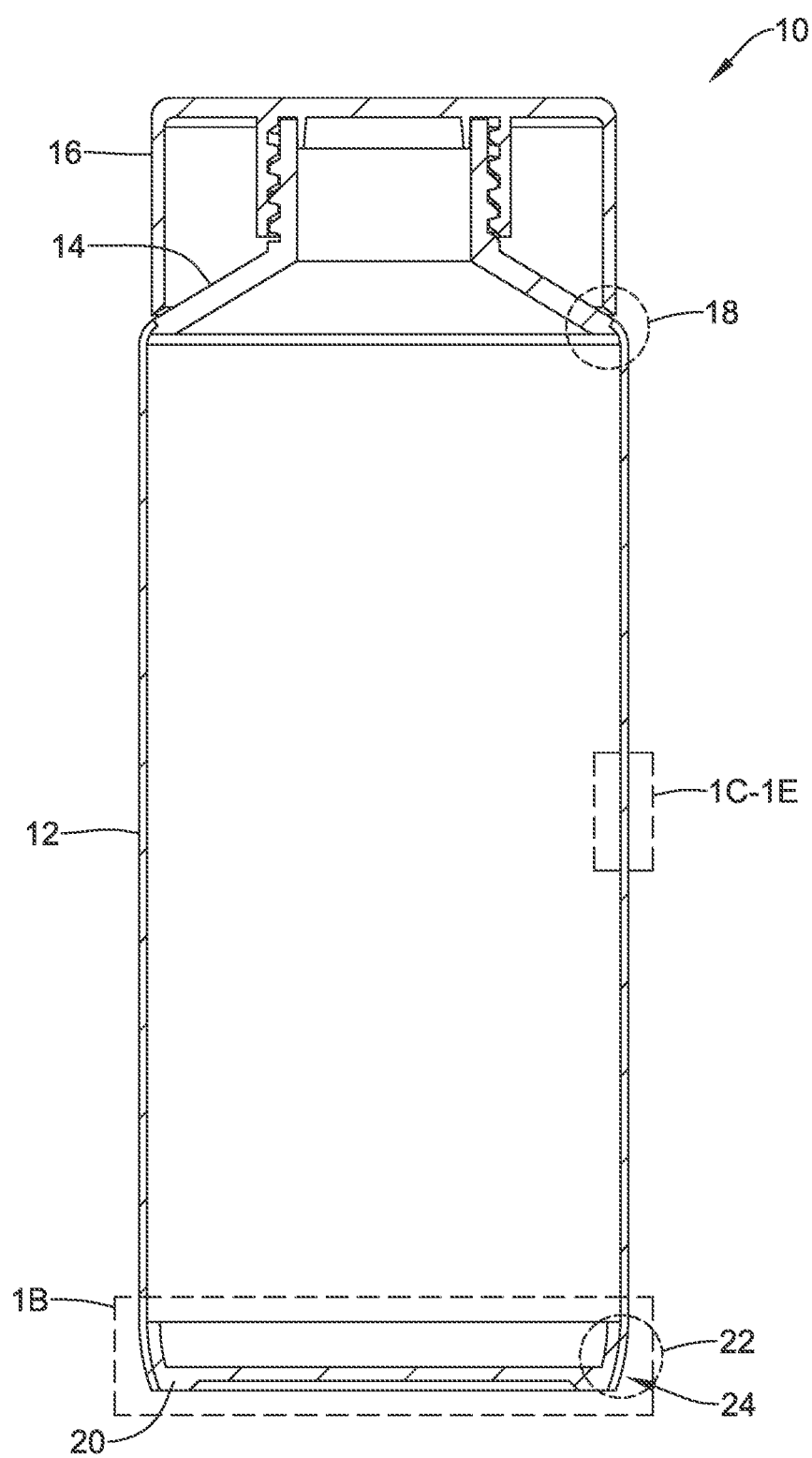
FIG. 1A is a section view of an illustrative example container.
Figure 1B:
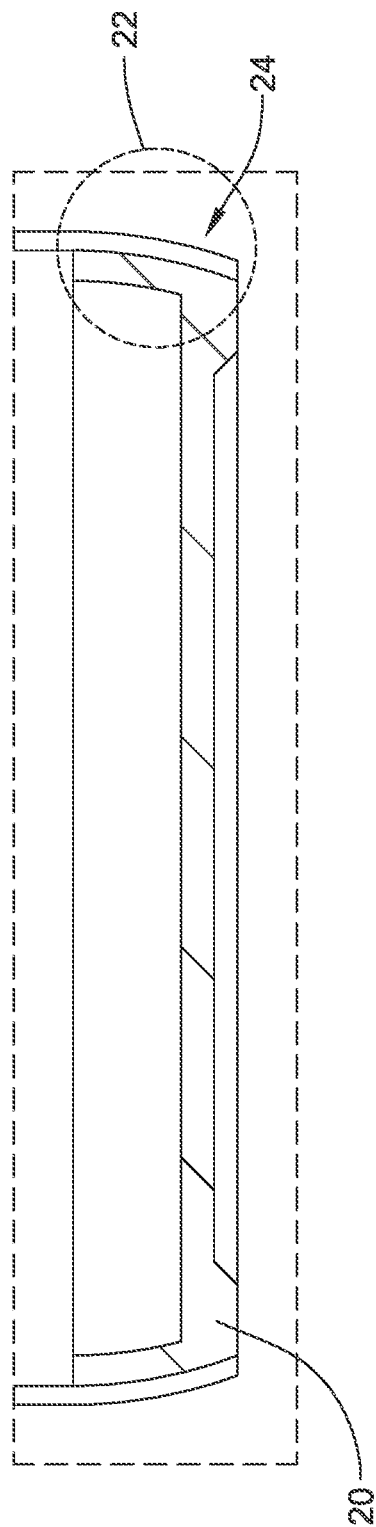
FIG. 1B shows a portion of Figure A at larger scale.

A thin-walled tube, as used herein, may refer to an extruded tube made in an extruder. A thin-walled tube may instead refer to a tube made by rolling a sheet of material into a tube-shape and welding or otherwise sealing a seam of the rolled sheet. Such tubes may be single or plural layer tubes, and may use walls having designs as illustrated below in FIGS. 1C-1F. A thin-walled tube may have a thickness of about 0.1 mm to about 2.0 mm. In some examples, a thin-walled tube may have a thickness of about 0.3 to about 1.0 mm, or about 0.7 mm, or any of 0.1, 0.2, 0.3, 0.4, 0.5, 0.6, 0.8, 0.9, 1.0, 1.1, 1.2, 1.3, 1.4, 1.5, 1.6, 1.7, 1.8, 1.9 or 2.0 mm. In some examples, a thin-walled tube may be strong enough to maintain its shape such as a container as shown in FIG. 1A, with or without product contained therein, can be stood on either end without collapsing. A thin-walled tube may have walls which are elastic to an extent allowing the tube to be squeezed to expel product and, on release of the squeezing force (and when not subject to vacuum forces at the dispensing aperture thereof), returns to its original shape.

A neck piece, referring to FIG. 1, may be as shown at 14, configured for use at one end of a tube and having attachment features, such as threading, annular protrusion for snap fitting, tabs, etc. for coupling to a cap, with an aperture therethrough for dispensing product from within the container. A neck piece 14 may have a first diameter at its intersection with the thin-walled tube 12, and a second diameter surrounding the aperture therethrough, as shown in FIG. 1A. Optionally the second diameter may be less than the first diameter, as shown in FIG. 1A, though this need not be the case in other examples.

An end cap may be as shown at 20, and is provided opposite of the neck piece. The end cap may omit an aperture therethrough for dispensing product. In some examples a piston or bag can be provided in the interior of the container to maintain a cosmetic product in an hermetically sealed environment and preventing degradation thereof, with a vent provided in the end cap 20 to allow air into the container to equalize air pressure as the volume defined by the bag or piston decreases when product is dispensed. As shown in some examples below, the end cap may be replaced with a second neck piece.

In some examples, a neck piece or an end cap may be a separately formed piece that can be attached to a thin-walled tube 12. In several examples, a thin-walled tube is made into a container by insert molding a neck piece or an end cap on a first end thereof, and then attaching a separately formed neck piece or end cap to a second end thereof. The attachment at the second end may be by, for example and without limitation, heat shrink, welding (such as thermal, laser, or sonic welding, for example), adhesive, pressure, and/or combinations thereof.

In some examples, the terms "assembly" and "integral process" are differentiated. A container or portion thereof may be manufactured via assembly by attaching together separately formed parts or pieces. A container or a portion thereof may be made by an integral process by adding material, such as by insert molding, to an existing piece or part. Thus, in an example, the neck piece is formed by an integral process if the neck piece is formed by insert molding on the thin-walled tube 12, and the end cap 20 is provided by assembly when a separately formed end cap 20 is welded, adhered, or otherwise attached to the thin-walled tube.

The examples shown herein are generally cylindrical, having a circular outer profile, however this particular shape is not limiting unless otherwise explicitly stated. For example, an oval or other shape may be used instead, if desired. An extruded thin-walled tube may be non-circular, such as oval or having a lobed outer profile. In other examples, a specific shape may be created by using circular or non-circular neck and end pieces, if desired.

FIG. 1A is a section view of an illustrative example container 10. A thin walled tube 12 is provided with a neck piece 14 at one end thereof, bonded in the region shown at 18. The neck piece 14 may be configured as shown for attaching to a cap 16; if desired, an applicator may be provided instead or in addition to the cap and also or instead attached to the neck piece 14. For example, the neck piece may have an outer annular portion with a snap fit projection or projections thereon to couple to the cap 16, with the threads shown used instead to couple to an applicator. In some examples, the neck piece 14 may be shaped to receive, such as by threading or snap fit, an applicator, as shown for example, at 439/441 in FIG. 18 of U.S. PG Pat. Pub. No. 2020/0138170, the disclosure of which is incorporated herein by reference. The applicator, if provided may be any suitable applicator, such as a thermal tip (ceramic or metal, for example, as described in U.S. Pat. Nos. 7,883,287, 9,498,042, 9,538,824, 9,565,920 9,578,949, the disclosures of which are incorporated herein by reference), stone (as in U.S. Pat. No. 9,642,440, for example, the disclosure of which is incorporated herein by reference) a plastic or gel tip (such as, but not limited to, a gel tip as in U.S. Pat. No. 9,913,524, the disclosure of which is incorporated herein by reference), or a brush, sponge, etc. Although not shown, a sealing O-ring or gasket may be included in cap 16.

At the other end of the thin-walled tube 12 is an end cap 20. In an illustrative example, the neck piece 14 may be attached to the thin-walled tube 12 by insert molding, in which the first end of the thin-walled tube is placed in a mold cavity while supported on a mandrel, and mold material is injected. The material to be molded may be any suitable material, such as low or high density polyethylene (LDPE, HDPE), polypropylene (PP), ethylene-acrylic acid copolymer resin (Surlyn®, for example), thermoplastic elastomers (TPE), polymethyl methacrylate (PMMA), blends or copolymers thereof, etc. Materials for the thin-walled tube are described further below.

After placement of the neck piece, the mandrel used in the insert molding process can be removed through the second, open end of the thin-walled tube, and another mandrel is placed through the opening in the neck piece 14. The second mandrel is advanced to support the end cap 20. As shown in the enlarged view of FIG. 1B, the end cap 20 is then attached to the thin-walled tube in region 22, shown in FIG. 1B. To attach the end cap 20, in some examples, pressure and/or heat may be applied in the direction of arrow 24, pressing the thin-walled tube against the end cap 20. Various details that are usable to facilitate this process of attachment at of the end cap 20 are discussed further below. In addition there are disclosed alternatives in which the end cap 20 is replaced by another neck piece 14 (the difference being that a neck piece is shaped for allowing material to be contained to be added or removed through an aperture thereof such that a second cap needs to be attached to the neck piece to seal the container). Further, in some examples, the end cap 20, rather than the neck piece 14, is insert molded, with the neck piece added by attachment of a separate piece.

Figure 1E:
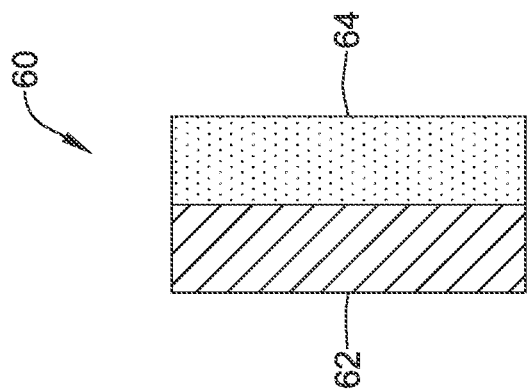
FIGS. 1C-1F show details of various wall constructions for the container of FIG. 1A.
Figure 1D:
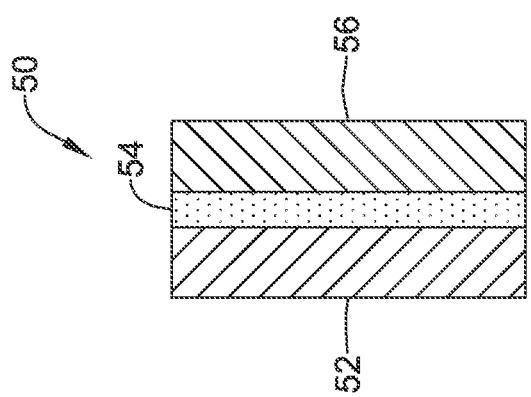
Figure 1C:
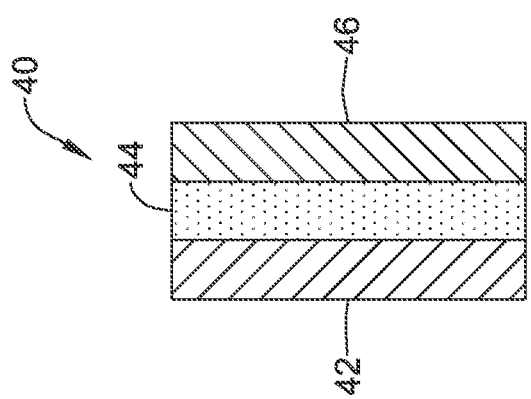

FIGS. 1C-1F show details of various wall constructions for the container of FIG. 1A. FIG. 1C shows a first example with a three-layer thin walled tube 40, having an inner layer 42, a middle layer 44 and an outer layer 46. Each layer 42, 44, 46 may have distinct properties, if desired, such as by having a relatively inert and hard inner layer 42 adapted to hold a cosmetics material in a chemically stable manner, transitioned by a middle layer 44 to a distinct outer layer 46 that is amenable to surface decoration, for example. In the example shown in FIG. 1C, the middle layer 44 may be nearly as thick as the other two layers; an alternative shown in FIG. 1D uses a very thin middle layer, which may in this case be a tie layer (if co-extruded) that aids in holding the inner and outer layers 52, 56 together if the two are dissimilar or subject to delamination, such as if one of the layers is a fluoroethylene (ETFE or PTFE, such as Teflon, for example) and another is an amide (polyether block amide, for example). A two layer construction can be coextruded instead, as shown in FIG. 1E. Rather than co-extrusions, the examples of FIGS. 1C-1E may represent laminated materials, such as, for example and without limitation, a polyfoil laminate having an aluminum middle layer 44/54 sandwiched between layers of polyethylene or other polymer, an elastomer, rubber, silicone, etc. Though not shown, coextrusions or laminates may have more than three layers, as for example certain polyfoil and other laminates which have three main layers and two interspersed layers of adhesive (PE/adhesive/aluminum/adhesive/PE, for example).

Figure 1F:
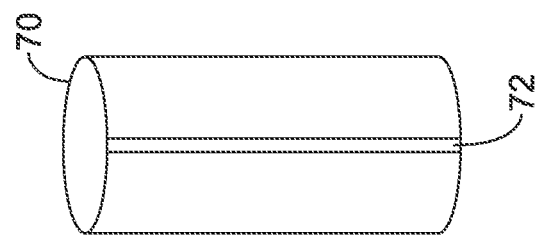

A laminate may be held together in a tube form as shown in FIG. 1F, in which a sheet of material 70, which may first be cut to size, is welded along a seam 72.

The thin walled tubes may, in some examples, be single layer tubes, if desired.

In addition to materials and combinations already noted above or discussed below, illustrative materials that may be used in the thin-walled tube include, but are not limited to polyethylene (including for example low, middle or high density), fluoroethylene, as desired), polyethylene terephthalate (PET) amides, copolymers, synthetic polymers, polypropylene (PP), polyurethane, rubber, silicone, nylon, and/or combinations thereof. Moreover, various elements may be made of any combination of substantially clear, substantially opaque, and/or translucent materials. One or more tie or adhesive layers may be included between layers of similar or dissimilar materials. If desired, one or more barrier layers (aluminum, Nylon, PET, Ethylene-vinyl alcohol (EVOH)) may be included. Any suitable dyes may be added, as desired.

If desired, one or more layers may be interrupted or provided intermittently. For example, an extruder may be controlled to limit application of one or more layers of material as the extruded piece is made, creating longitudinal gaps between lengths of the omitted layer. Bonding as shown below may be enhanced by providing the intermittent layer only in regions where welding/bonding is desired, with the intermittent layer acting to add strength or to improve bond characteristics at locations where bonding is needed.

In still other examples, a layer that may inhibit bonding can be omitted at locations where bonding is needed. Such omission can be achieved during the extrusion process, or may be achieved by post-extrusion processing such as by grinding. This may be useful if, for example, an inner or outer layer of a co-extrusion is formed of a higher melt temperature material than other layers, making it easier to achieve a weld if the higher melt temperature material is omitted. Omission may also be useful if an inert or slippery or lubricious material adapted for holding a product is included as an inner layer at positions where the contained product is to be placed and omitted at positions where bonding to an end cap or neck piece is desired. For example an inner PTFE layer can be omitted or removed at the bond location 24 shown in FIG. 1A, but otherwise included.

Figure 2:
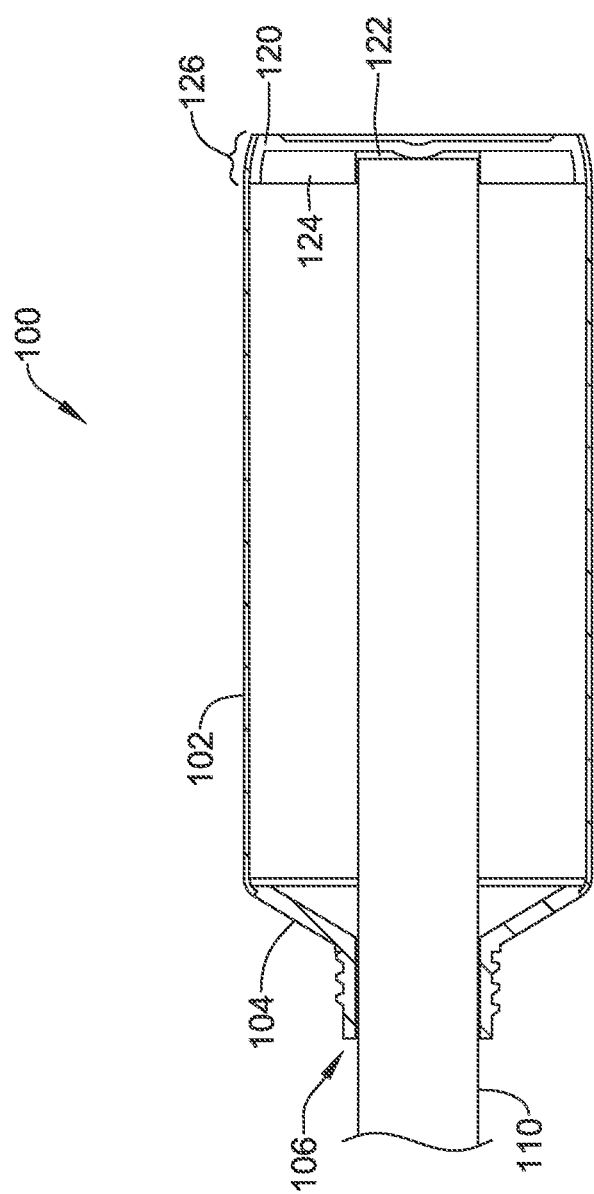
FIG. 2 is a section view showing an illustrative container manufacturing step.
Figure 3:
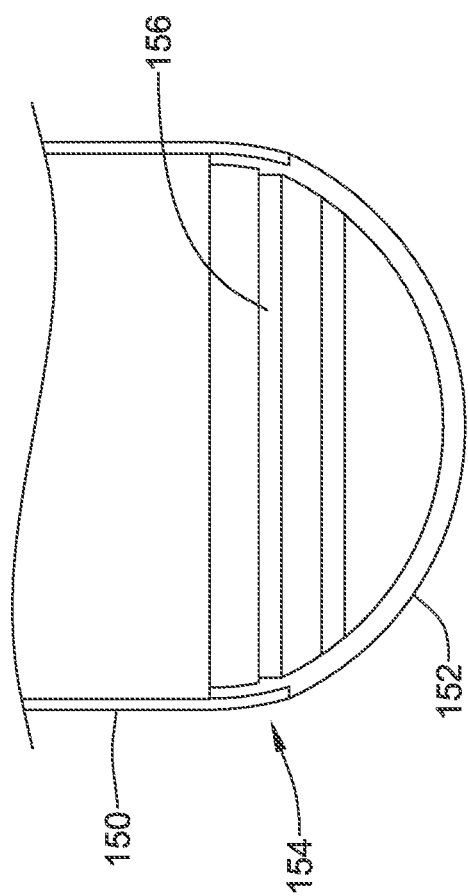
FIGS. 3-6 show, in section view, portions of illustrative containers and end caps.

FIG. 2 is a section view showing an illustrative container manufacturing step. In this example, a container 100 is formed using a thin-walled tube 102 that is attached at a first end, by an integral process such as insert molding, to a neck piece 104 that defines an aperture or opening shown at 106. An alternative may place the neck piece 104 in an assembly step by attachment to the thin-walled tube 102 after the neck piece 104 is separately made. After the neck piece 104 has been attached to the thin-walled tube 102 at a first end thereof, a mandrel 110 is advanced through the opening 106 toward the second end of the thin walled tube 102.

An end cap 120 is placed on the mandrel 110. In the example shown, the end cap 120 may include a receiving region, such as a slot 122 or an indentation, for receiving the mandrel 110. Heat and/or pressure are then applied along region 126 to bond, such as by sonic, heat, or laser welding, the thin-walled tube 102 to the end cap 120. The mandrel 110 may be received in the slot so that a secure placement can be had, allowing pressure to be applied on the outside of the thin-walled tube 102 and end cap 120 during attachment, with lateral support provided by a portion 124 of the end cap 120 extending from the slot 122 to the perimeter region of the end cap 120.

The end cap 120 in FIG. 2 is flat on the bottom thereof, with a perimeter that tapers slightly along region 126. Other designs may be used. FIGS. 3-6 show, in section view, portions of illustrative containers and end caps. Starting in FIG. 3, a thin walled tube 150 is attached at region 154 to a dome shaped end cap 152 to form one end of the container. An interior rib or ribs 156, either as extra plastic or a co-molded wire or ring, for example, may optionally be provided beneath region 154, which is adapted to receive the end of the thin-walled tube for lateral support. Though not shown, a slot for receiving a mandrel may also be provided on the interior of the dome in this example. The rib or ribs 156 may be omitted in other examples.

Figure 4:
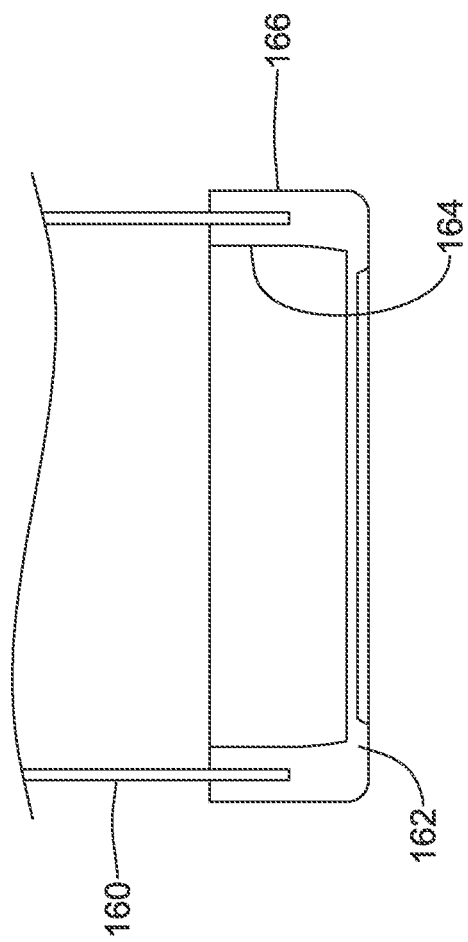

FIG. 4 shows another example. Here the end cap 162 is attached to the thin-walled tube at an annular recess between an inner wall 164 and an outer wall 166. In an example, the inner wall 164 may have a reinforcing member therein or may be made of a material having a higher melt temperature, for example, than the outer wall 166, so that the thin walled tube 160 can be welded to the outer wall 166 with pressure applied on the outside thereof while supported by the inner wall 164. The noted reinforcement may be omitted in other examples. A slot as in the example shown in FIG. 2 may be added, if desired.

Figure 5:
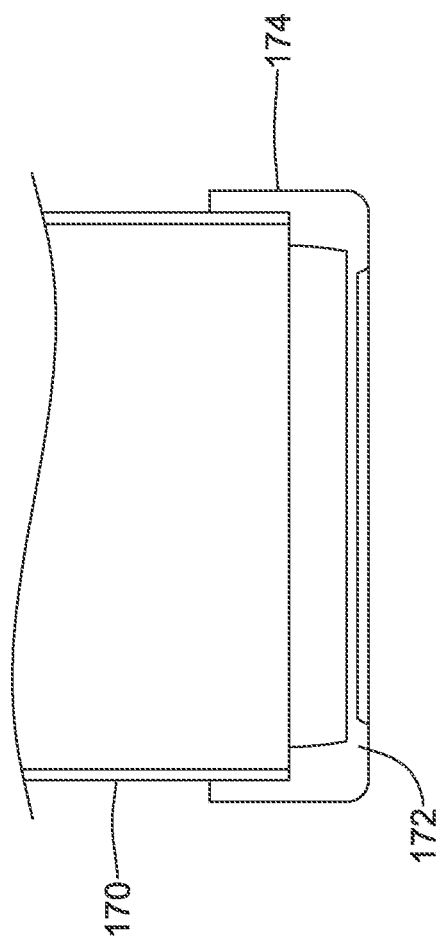

FIG. 5 shows another example. Here, the end cap 172 is attached to the thin-walled tube 170 with the thin-walled tube 170 inserted into the end cap 172. In an example, a mandrel is placed against the inside of the end cap 172 and an outer mold is applied to the outside of the end cap 172 (the bottom of the image in FIG. 7 would be the outside of the end cap 172), while the opening at the opposite end of the thin-walled tube 170 is sealed, and air pressure is applied inside the thin-walled tube 172 to limit deformation of the thin-walled tube 172 during welding to the end cap 172. In another example, an expandable mandrel may be inserted into the thin-walled tube 170 to support the interior thereof during attachment to the end cap 172. A slot as in the example shown in FIG. 2 may be added, if desired. The end cap 172 may instead by provided by an integral process.

Figure 6:
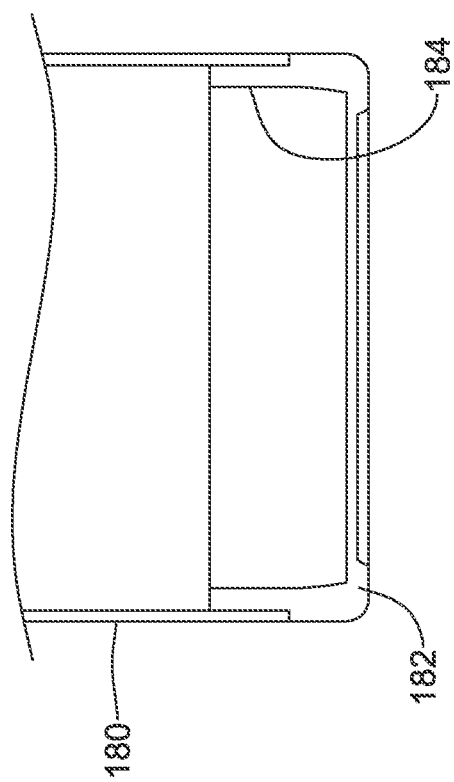

FIG. 6 shows another example. Here the end cap 182 receives the thin-walled tube 180 in region 184 with can be seen to have a lower terminus against which the thin-walled tube 180 abuts when attached. For welding purposes the region 184 of the end cap 182 may optionally be reinforced either structurally by having ribs or lateral support as shown in FIG. 2, or by the inclusion of a wire or ring to provide added strength, if desired. A slot as in the example shown in FIG. 2 may be added, if desired.

Figure 7:
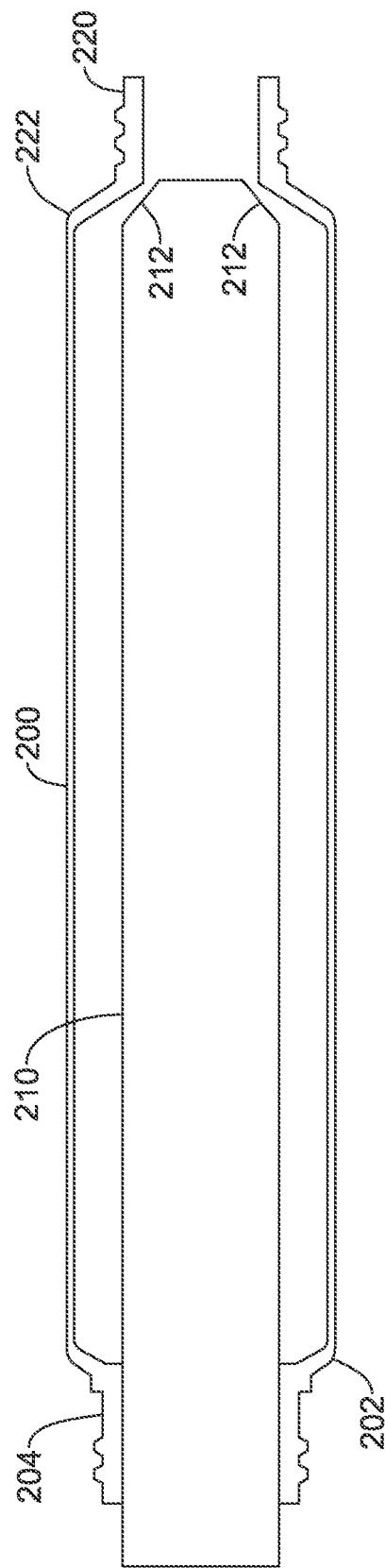
FIG. 7 is a section view showing an illustrative container manufacturing step.

FIG. 7 is a section view showing an illustrative container manufacturing step. In this example, a first neck piece 204 has been attached at region 202 to a thin-walled tube 200, either in an assembly or integral process. A mandrel 210 is then placed through the opening in the first neck piece 204, as shown. A distal end of the mandrel 210 is tapered as shown at 212 in a frustoconical (truncated cone) shape, adapted to provide support regions for the placement of a second neck piece 220, which is in this example added by an assembly step such as by welding or adhesive attachment at region 222. During the process of attaching the second neck piece 220 to the thin-walled tube 200, pressure can be applied in a manner that squeezes the thin-walled tube 200 and second neck piece 220 against the surface at 212 of the mandrel, for example, while using a second neck piece 220 rather than an end cap.

Figure 8A:
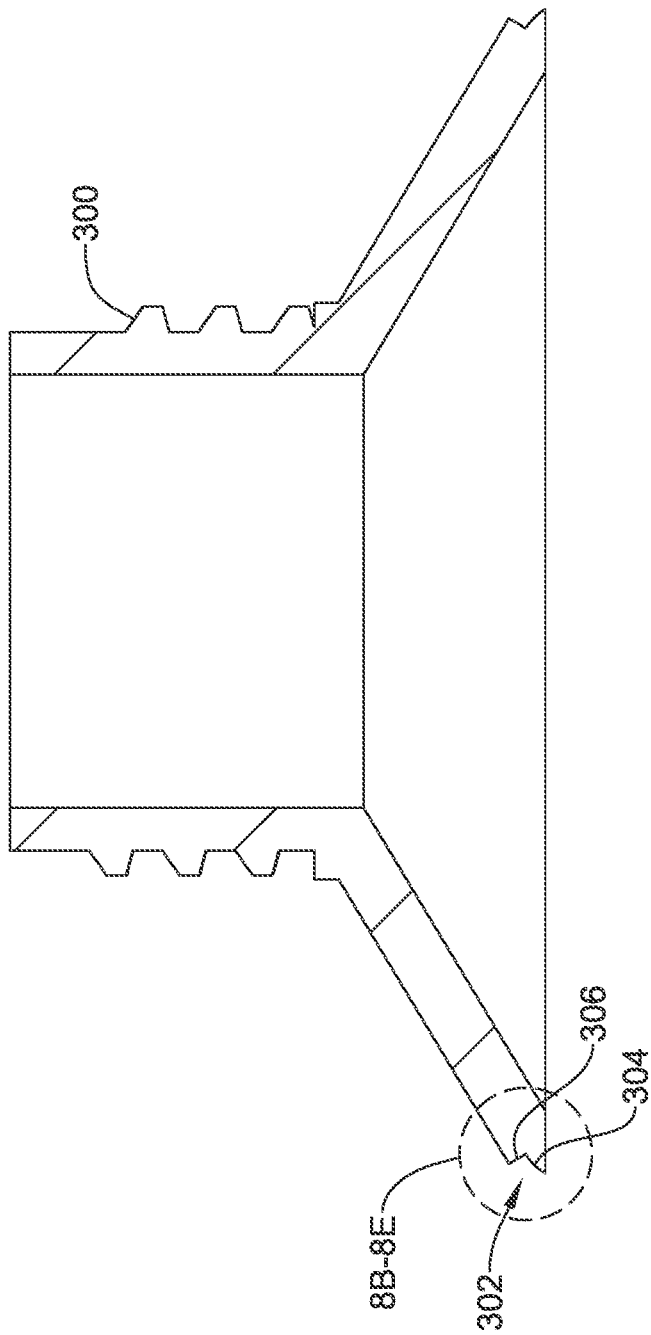
FIG. 8A is a section view of an illustrative neck piece for a container.

FIG. 8A is a section view of an illustrative neck piece for a container. The neck piece 300 is shown having threading thereon and defining a region at 302 for attaching to a thin-walled tube. As shown in the expanded inset, the region 302 for attachment has a length 304 and a depth 306. The depth 306 may be selected to match a thin-walled tube once attached under heat and pressure—that is, the depth may not be the same as the thickness of a thin-walled tube, however, due to slight tapering of the thin-walled tube during the attachment process, and with the addition of heat and pressure, the resulting seam will preferably be flush. For example, the depth 306 may be in the range of about 0.3 to 2.0 mm, preferably slightly greater (0.05 to 0.1 mm) than the thickness of the thin-walled tube, though some examples may use a depth 306 equal to or even somewhat less than the thickness of the thin-walled tube, if desired. The length may be any suitable distance, such as, for example and without limitation, 0.5 to 3 mm, or more or less, preferably sufficient to enable durable and airtight attachment. Illustrative and non-limiting design options for region 302 further described in FIGS. 8B-8F.

Figure 8C:
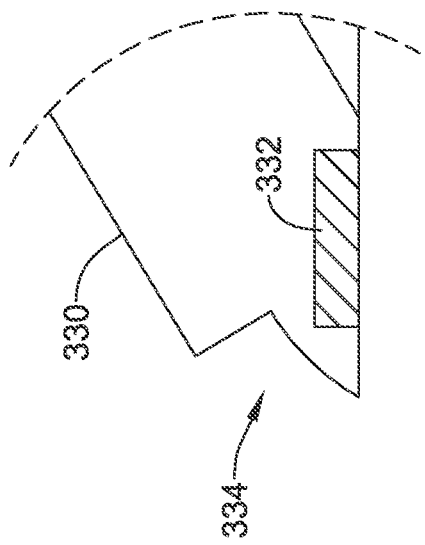
Figure 8E:
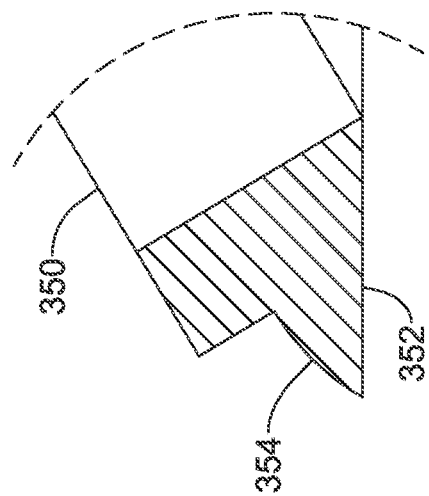
Figure 8B:
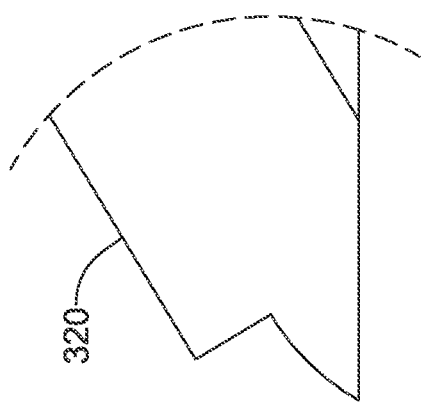

FIGS. 8B-8F show several options for the illustrative neck piece of FIG. 8A. FIG. 8B shows a first example in which the neck piece 320 is a relatively simple molded piece having no added treatments or support structures. This may be suitable in many circumstances, as the thin-walled tube can be attached by welding to the neck piece 320 by using the intrinsic strength of the neck piece 320 to support the pressure and heat used in a welding step, due to the neck piece having a greater thickness than the thin-walled tube. For example, the neck piece may be thicker, such as in the range of about 1.0 to about 3.0 mm thick.

FIG. 8C shows another example. Here, a reinforcing ring is provided at 332 in the neck piece 330, in the vicinity of the attachment region 334. The reinforcing ring may be made of a different material, such as a material having a higher melt point or greater strength than the rest of the neck piece 330. For example, a metal ring, or alternatively a ring of a higher strength and/or melting point plastic, may be provided at 332 by insert molding into the neck piece 330, or by snap or adhesive fit after the neck piece 330 is molded with an indentation to allow placement of the reinforcing ring 332. A magnetic metal material may be used, if desired.

Figure 8D:
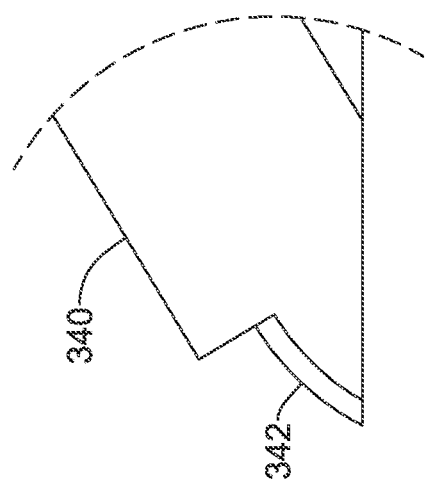

FIG. 8D shows another example. Here, an attachment ring is provided at 342. The attachment ring 342 may be selected to provide enhanced adhesion between the neck piece 320 and the thin-walled tube, such as by using a lower-melt point material. Attachment to the neck piece 340 may be achieved by insert molding with the neck piece 340, for example, or by applying the attachment ring 342 after molding of the neck piece 340 using a separate welding step or adhesive attachment.

FIG. 8E shows another example. Here the entire attachment region 354 is provided by a separate piece 352 that is attached to the rest of the neck piece 350, such as by insert molding the separate piece 352 with the neck piece 350. Again, different materials may be used for the separate piece 352 and the neck piece 350 to provide greater resilience during welding of the thin-walled tube.

FIG. 8F shows an example as in FIG. 8C with a thin walled tube 336 attached. Applied pressure and heat causes the end portion of the thin walled tube 336 to align in conformity with the outer portion of the neck piece 330 along region 338. The ring 332 provided added strength to the neck piece 330 during the step of attaching the thin walled tube 336.

Figure 9A:
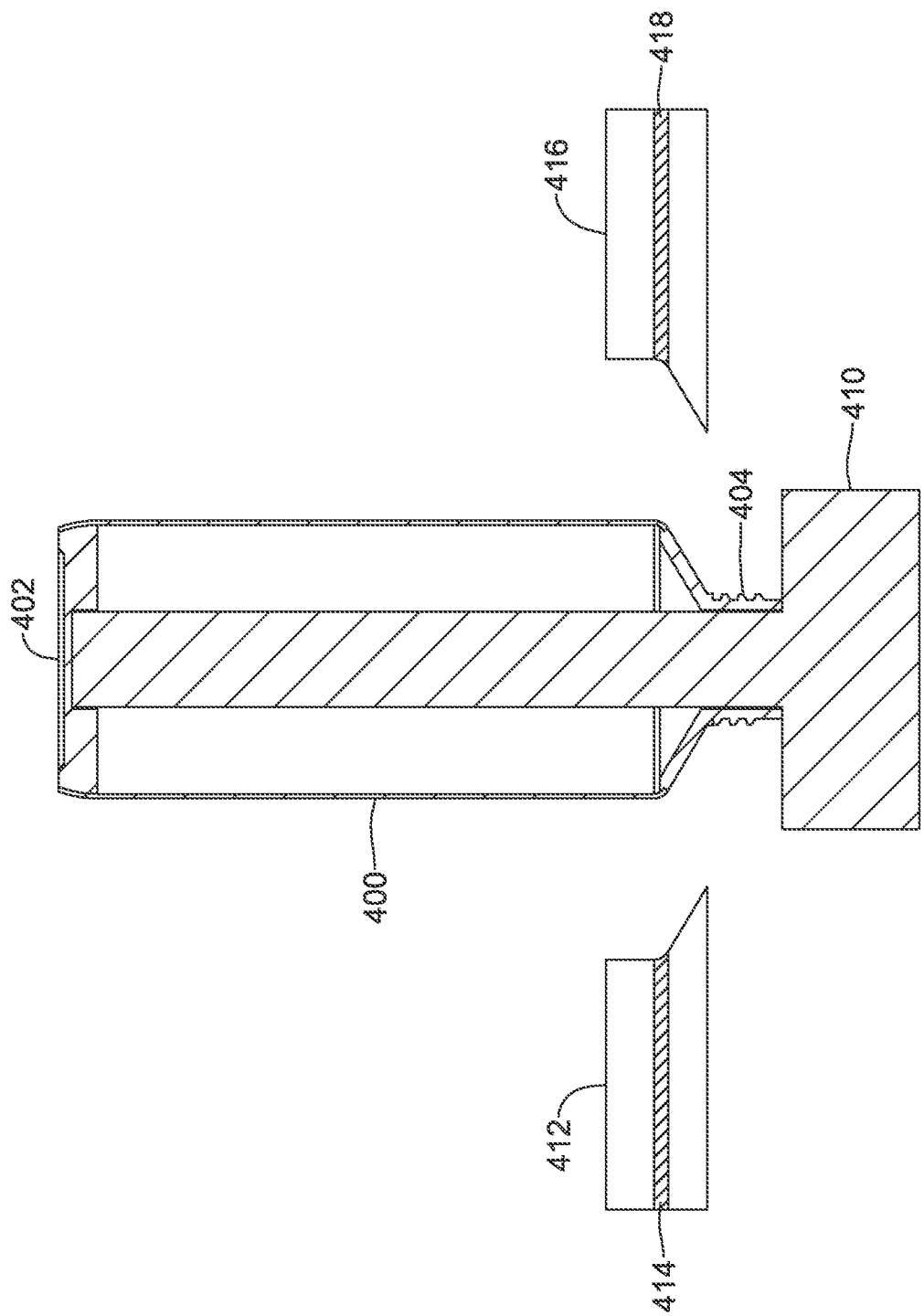

FIGS. 9A-9B are section views of illustrative container manufacturing steps. In FIG. 9A, a container is shown with an end cap 402 already attached to a thin-walled tube 400, either by assembly or integral process. A neck piece 404 is to then be attached. As with other examples, the neck piece 404 includes a receiving portion for receiving a cap, illustratively shown with threading though other mechanisms (such as a snap fit ridge or magnet) may be used for attaching or securing the cap, having an aperture therethrough. In this example, the neck piece 404 is placed over a mandrel 410 which also supports the end cap 402. Further it can be seen that the receiving portion of the neck piece 404 rests on the mandrel 410 with this example, a feature that may also be used (though not always shown as such) in the examples of FIGS. 2, 7, 11A-11C, 12A-12C, 13A-13B, as well as in the various options of FIG. 15.

With the thin-walled tube 400 trimmed to a desired length, a portion thereof will overlap an attachment portion of the neck piece 404, such as shown in any of FIGS. 8A-8E. Resting the neck piece 404 on the mandrel as shown may simplify this part of the process by facilitating reliable positioning of the parts. A fixture for welding the neck piece 404 to the thin-walled tube 400 is shown having at least first and second opposing sections 412, 416. Each of the fixture sections 412, 416 may have a heat-application region 414, 418, such as a resistive element that generates heat, or a vent (allowing heated steam or plasma to pass therethrough), or an aperture for a laser weld. The heat applying regions 414, 418 may be independently moveable relative to the rest of each fixture section 412, 416, if desired. The heat application region 414 may instead comprise a transducer for laser or sonic welding.

The weld can then be generated as shown in FIG. 9B by bringing the fixture sections 412, 416 together to press against the thin-walled tube 400 and neck piece 404, generating a weld at the positions contacted by the heat application regions 414, 418.

Figure 10A:
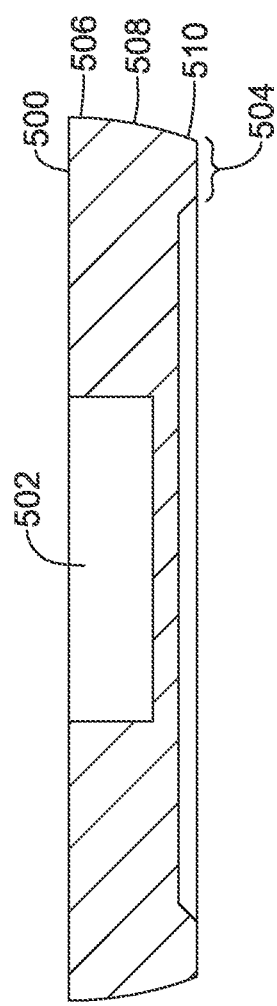
FIGS. 10A-10B show, in section and perspective views, illustrative end caps.
Figure 10B:
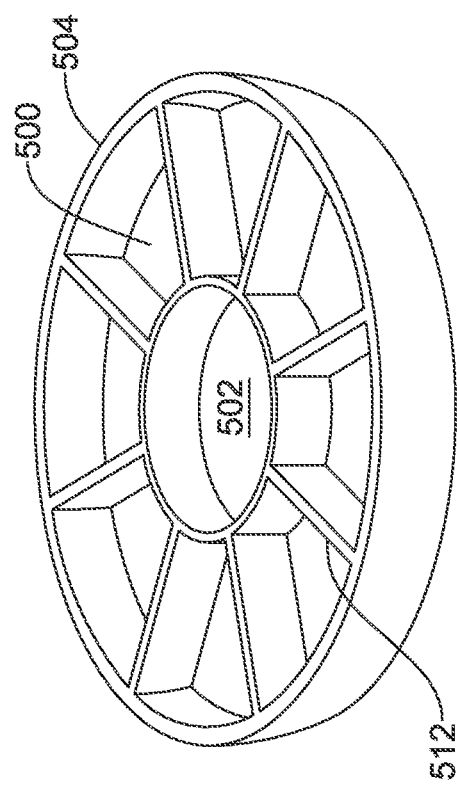

FIGS. 10A-10B show, in section and perspective views, illustrative end caps. Starting with FIG. 10A, an end cap 500 can include a slot 502 for receiving a mandrel and defines an outer wall 504 on which thin-walled tube is attached to the end cap 500. In some examples, a weld to a thin-walled tube can be provided at one or more of an upper position 506, middle position 508, or bottom position 510.

In some examples, the area between the slot 502 and the outer wall 506 is solid about the circumference thereof. In the example of FIG. 10B, on the other hand, a plurality of rib reinforcements 512 are provided to offer lateral support to the outer wall 504 during assembly/welding to the thin-walled tube. This approach may reduce the amount of material needed for each end cap 500.

Figure 10C:
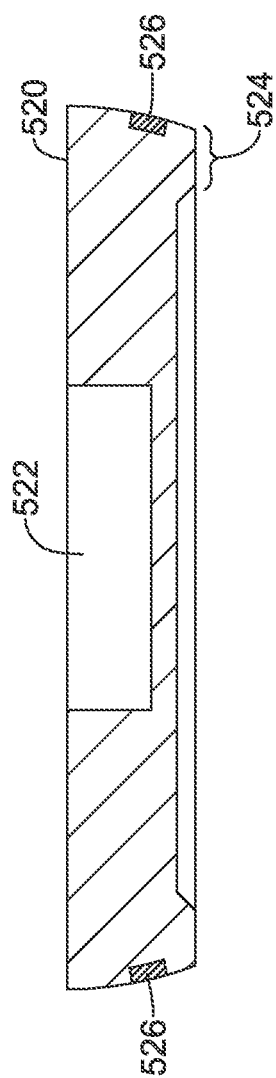
FIGS. 10C-10D show options for the illustrative end caps of FIGS. 10A-10B.

In the example of FIGS. 10A-10B, a molded end cap is shown without additional reinforcement or attachment regions. FIG. 10C shows an alternative in which a ring member 526 is provided in the end cap, as by insert molding, to reinforce the outer circumference thereof. For example, a metal piece, or a piece of a different plastic type can be embedded in the end cap 520 to add support that limits or prevents deformation of the outer wall 524 during the weld step due to the applied heat and pressure. Optionally the design may include the above discussed slot for receiving a mandrel. The ring member 526 is shown in the Figure as extending to the outer edge, but may be instead embedded in the end cap without reaching outer edge, to provide a smooth surface entirely of plastic for bonding, if desired.

Figure 10D:
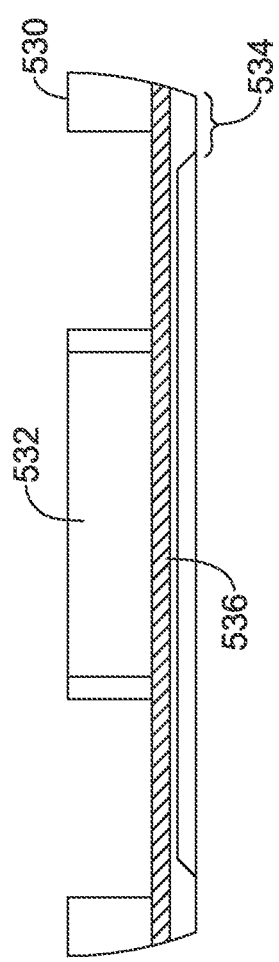

FIG. 10D shows another example, here with a longitudinal member 536 extending across the diameter of an end cap 530, providing lateral support to the outer wall and avoiding the need for support material around the slot 532. The longitudinal member 536 can be provided by insert molding, for example. Other designs may be used, including the provision of an interior support member on the inside of the outer wall 530 going about some or all of the inner circumference thereof. While in the Figure the longitudinal member extends to the edge, it may terminate short of the outer edge to remain hidden both from view and also providing an uninterrupted outer edge for bonding purposes.

Figure 11B:
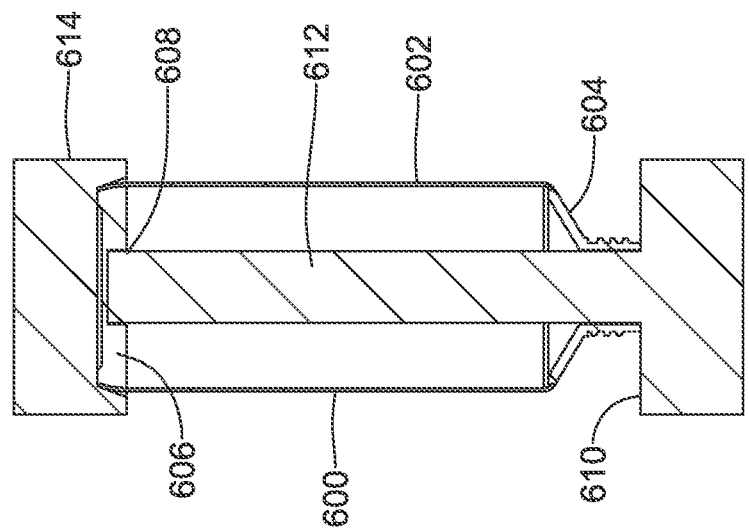
FIGS. 11A-11C illustrate steps of an example manufacturing method.
Figure 11A:
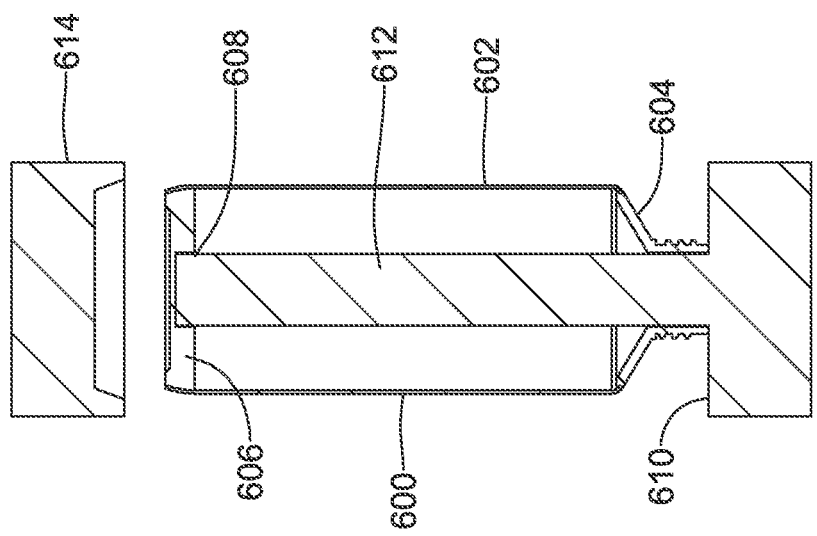
Figure 11C:
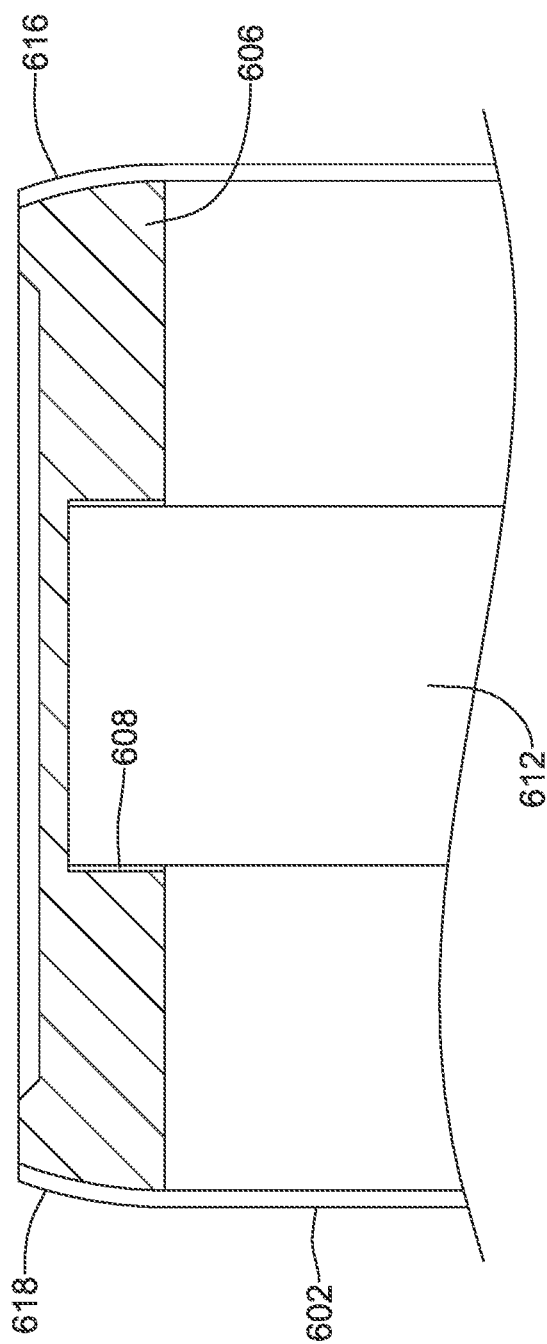

FIGS. 11A-11C illustrate steps of an example manufacturing method. In the illustrative method, as shown in FIG. 11A, a partial container 600 having a thin-walled tube 602 is already provided with a neck piece 604 made by, for example, assembly or integral process, forming a partial container with thin-walled tube 602 and neck piece 604. The partial container is placed on a mandrel 610, having a portion 612 that extends through the opening of the neck piece 604.

An end cap 606 is placed on the end of the mandrel 610, and is shown with a slot 608 for receiving the mandrel 610. The mandrel 610 as a result supports the end cap 606 relative to a fixture 614 which is used during the molding step. FIG. 11A shows the alignment of these pieces prior to the welding step. As shown in FIG. 11B, the fixture 614 is then lowered into position. FIG. 11C shows a closer section view. The fixture 614 has a tapered lead in 616 to a recess in which the welder 618 is placed. The welder 618 may be, for example, and without limitation, a heated portion of the fixture 614 as by having an electrical conductor through which current is driven, creating heat, or by including a transducer for generating sonic or laser energy that can be applied to the thin-walled tube 602 at the desired weld location. Pressurized plasma, air or steam (or other media) may be applied through one or more apertures at the welder 618 instead in some examples. Some amount of reflow can occur within the tapered region 616 of the material forming the end cap 606 and/or thin-walled tube 602, resulting in a clean appearance to the finished product. Pressure is applied, in this example, in a largely vertical direction as the weld is applied.

Figure 12C:
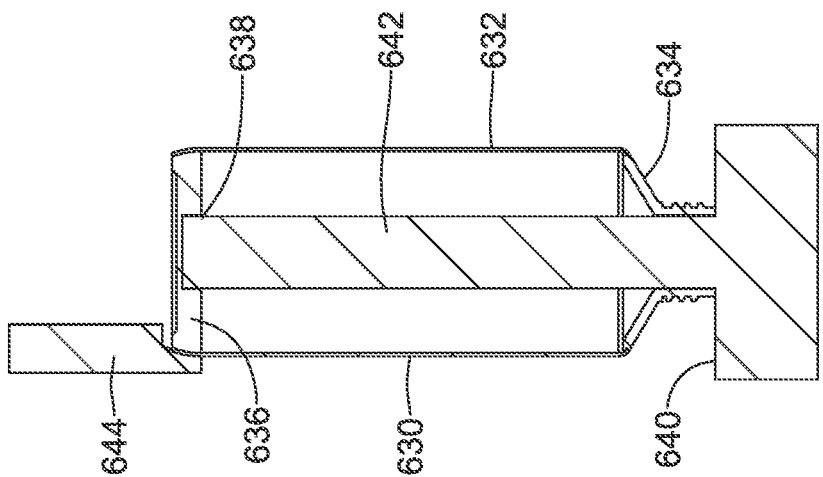
FIGS. 12A-12C illustrate steps of another example manufacturing method.
Figure 12B:
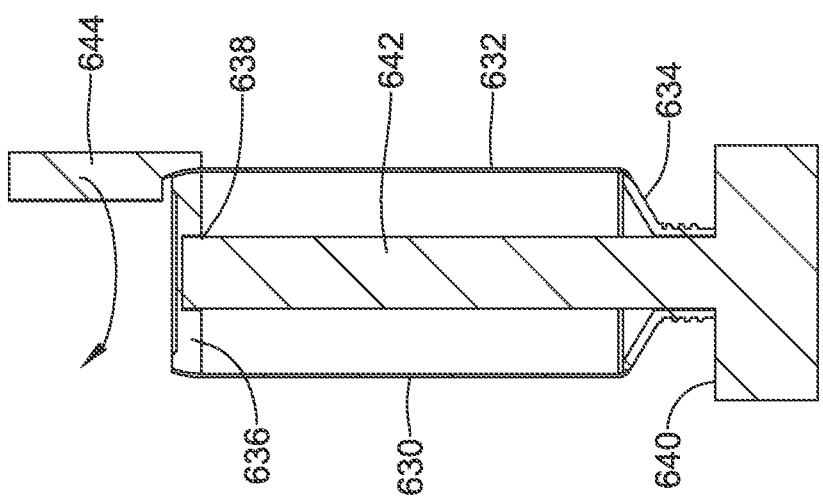
Figure 12A:
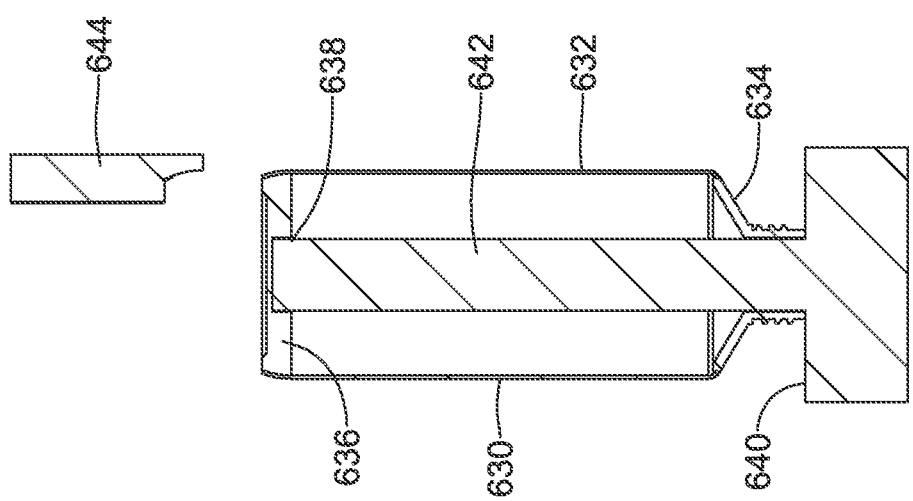

FIGS. 12A-12C illustrate steps of another example manufacturing method. Here, again, a container 630 is shown as a partial assembly of a thin-walled tube 632 and neck piece 634, which is placed on a mandrel 640 having a portion 642 that extends through the opening in the neck piece 634 a terminus that sits in a slot 638 of an end cap 636. A fixture is shown at 644 for use in the weld process; as shown in FIG. 12A the juxtaposition of parts is a pre-weld position. FIG. 12B illustrates that the fixture 644 moves relative to the mandrel 640 (and thus the partial assembly of container 630) to come into contact with the thin-walled tube 632 and end cap 636. Heat and pressure are applied by the fixture 644, which is then rotated about the central (vertical in the Figures) axis of the container to provide a seal around the end cap 636, as indicated in FIG. 12C. In some examples the fixture 644 may comprise rollers or wheels to facilitate and/or control rotation of the container, or the mandrel 640 may be non-circular to associate with and prevent rotation relative to the slot 638 in the end cap 636. In The fixture 644 may itself include a welder as described above relative to element 618. While a single FIG. 644 is shown, it should be understood that two, three, or more fixtures similar to 644 may be provided about the circumference of the end cap 636. In an example, three fixtures 644 are equally spaced about the circumference of the end cap.

Figure 13B:
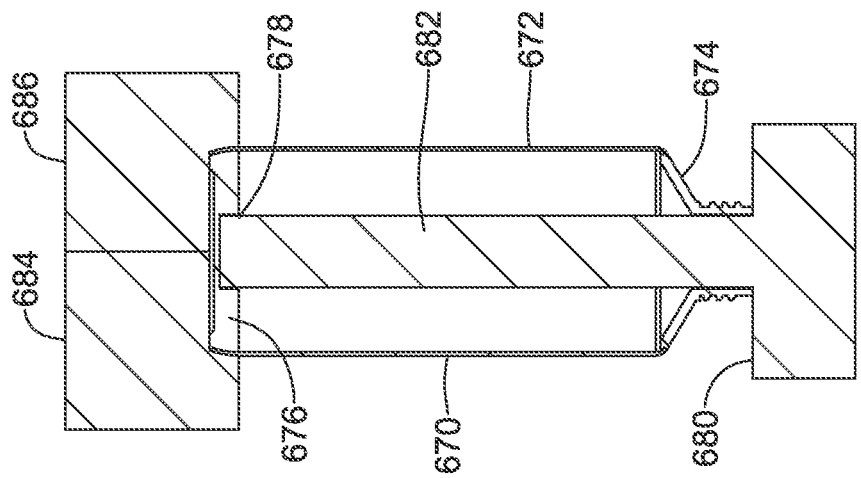
FIGS. 13A-13B illustrate steps of yet another example manufacturing method.
Figure 13A:
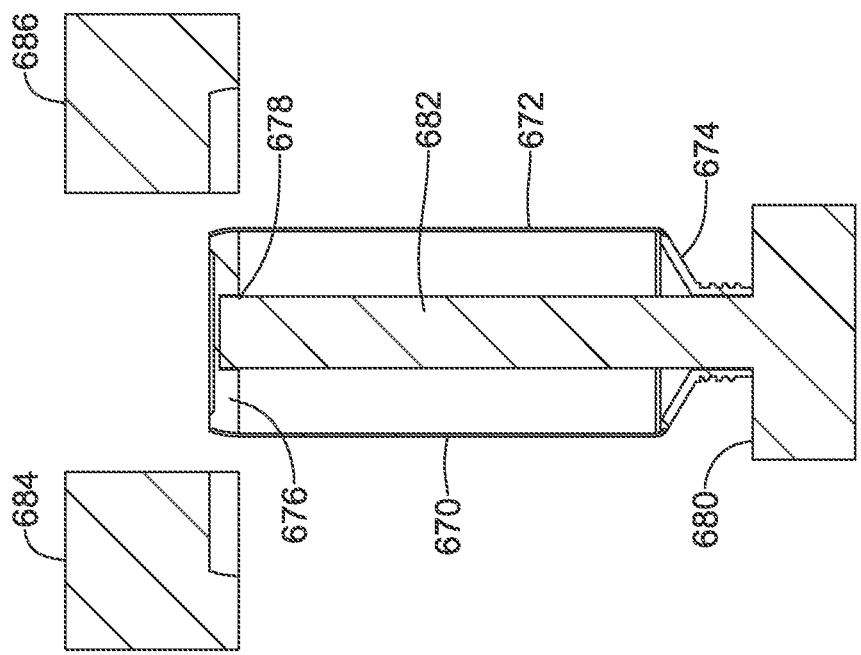

FIGS. 13A-13B illustrate steps of yet another example manufacturing method. A partial assembly of container 670 is provided with a thin-walled tube 672 already attached (by assembly or integral process) to a neck piece 674, through which a mandrel 680 is placed. A portion of the mandrel 682 mates with and supports and end cap 676 at a slot 678. A two part fixture is used in this example, with the parts shown at 684, 686 forming a split fixture; more than two parts may be used if desired.

As shown in FIG. 13A, the fixture parts 684, 686, pre-welding, are spaced from the thin-walled tube 672 and end cap 676. As shown in FIG. 13B, the fixture parts 686, 686 come together by motion in a lateral dimension, applying pressure around the outside of the perimeter of the thin-walled tube and end cap 676. A welder as described and shown above as element 618 may be integrated into each of the parts 684, 686. One downside with the example in FIGS. 13A-13B is the potential to leave a weld line or lines where the fixture parts 684, 686 meet, though any residual flash or line may be removed in a subsequent step such as polishing/grinding or reflow.

While the description of FIGS. 11A-11C, 12A-12C, and 13A-13B indicates that the neck piece has been attached already by assembly or integral process, in some examples, the neck piece may be omitted and the process shown can be used to attach an end cap to a thin-walled tube prior to placement of a neck piece or other end on the opposite end of the thin-walled tube from the end caps shown.

Figure 14A:
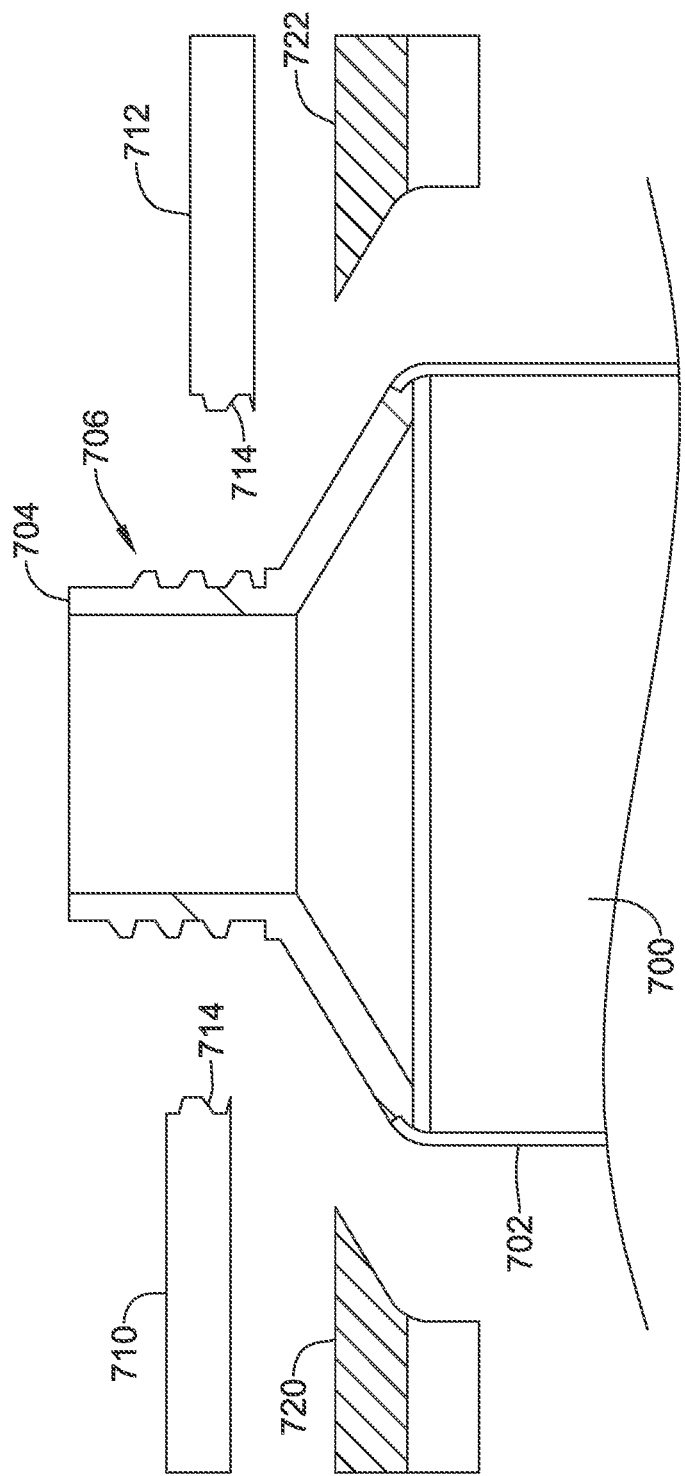
FIGS. 14A-14F illustrate steps of an example manufacturing method.
Figure 14B:
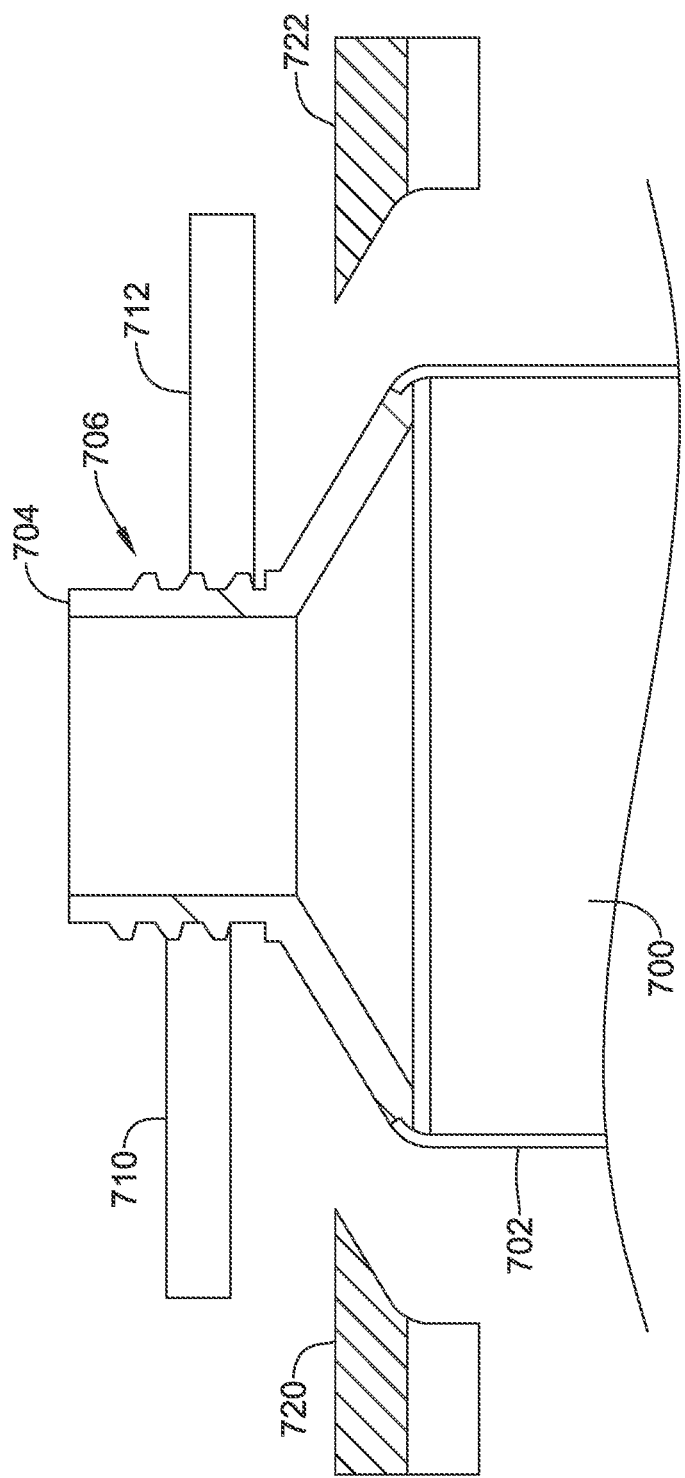
Figure 14C:
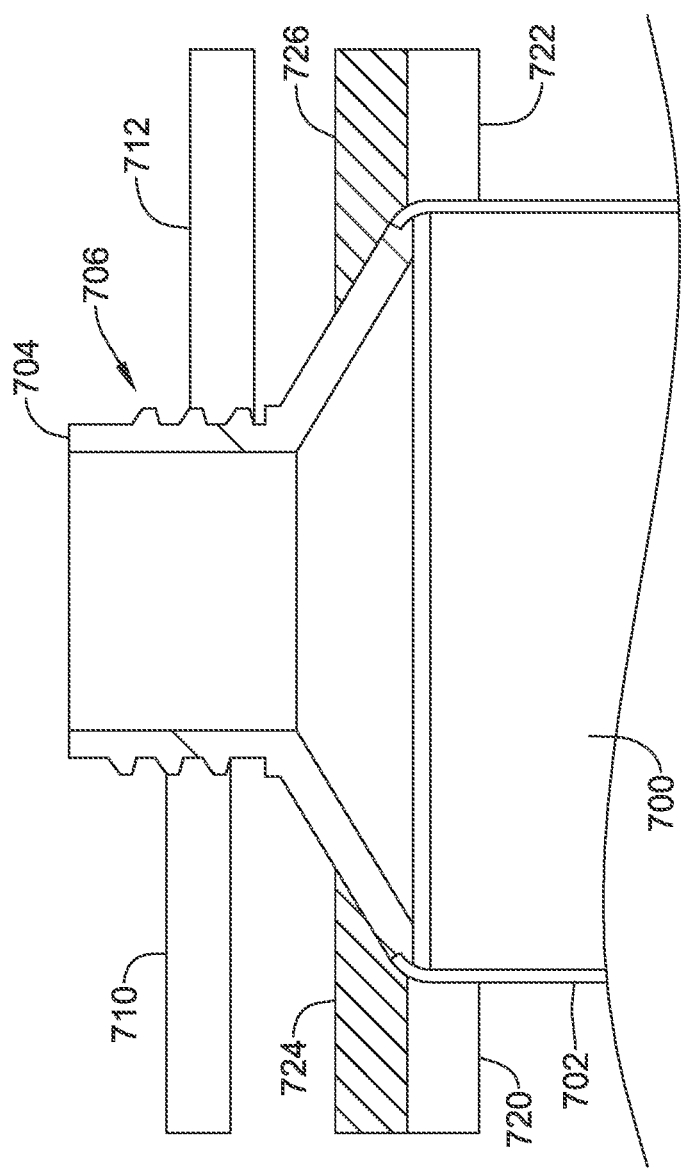

FIGS. 14A-14C illustrate steps of an example manufacturing method. FIG. 14A shows a section view of a portion of a partial assembly. In this example, the thin-ix) walled tube 702 of a container 700 has already had an end cap (not shown) placed on one end thereof by either assembly or integral process, though optionally the end cap may not have already been placed in some examples. A holding fixture is illustrated at 710, 712 as a two piece feature with one or more of the pieces having holding ridges 714 configured to interact with and hold in position the threading 706 on a neck piece shown at 704, though more pieces than two may be used. Alternatively a single piece holding fixture may be used by twisting onto the threading 706, if desired, or by having the holding ridges 714 retractable to allow the holding fixture to be placed over the threading at 706, and the ridges 714 then extended to a lock position that will hold the neck piece 704. In still other examples, the ridges 714 and threads 706 may be omitted, and direct pressure applied by the holding fixture 710, 712, without the ridges/threads, can be used to hold the neck piece 704 in place. If desired, an inner mandrel (not shown) may pass through the opening of the neck piece 704 to provide lateral support against which the holding fixture 710, 712 may apply pressure. A welding fixture is shown as a two piece fixture at 720, 722; a single piece, or three or more pieces, may be used instead.

FIG. 14A shows a pre-weld positioning of the fixtures and container. FIG. 14B shows a next step, in which the holding fixture 710, 712 closes on the upper portion of the neck piece 704, and engaged with the threads 706. Rather than engaging threads 706, the holding fixture may engage tabs or a ridge for devices in which the neck piece 706 does not use threads and instead closes by snap fit or other mechanism. As noted, an additional mandrel may be inserted inside the opening in the neck piece 704 for internal support, if desired.

With the neck piece secured by the holding fixture 710, 712, the method proceeds to that shown in FIG. 14C, wherein the welding fixture 720, 722 is closed onto the lower portion of the neck piece 704 where it overlaps the thin-walled tube. Welding heat and pressure may then be applied. In an example, the welding heat and pressure may be applied to the sloped portion, corresponding to applying heat with the welding elements 724, 726, which may be heated and/or separately actuated, if desired. Welding may include application of any of heat, sonic, or laser energy, or the application of media such as steam or a plasma to create localized heating under pressure to cause welding of the thin-walled tube 702 to the neck piece 704.

Figure 14D:
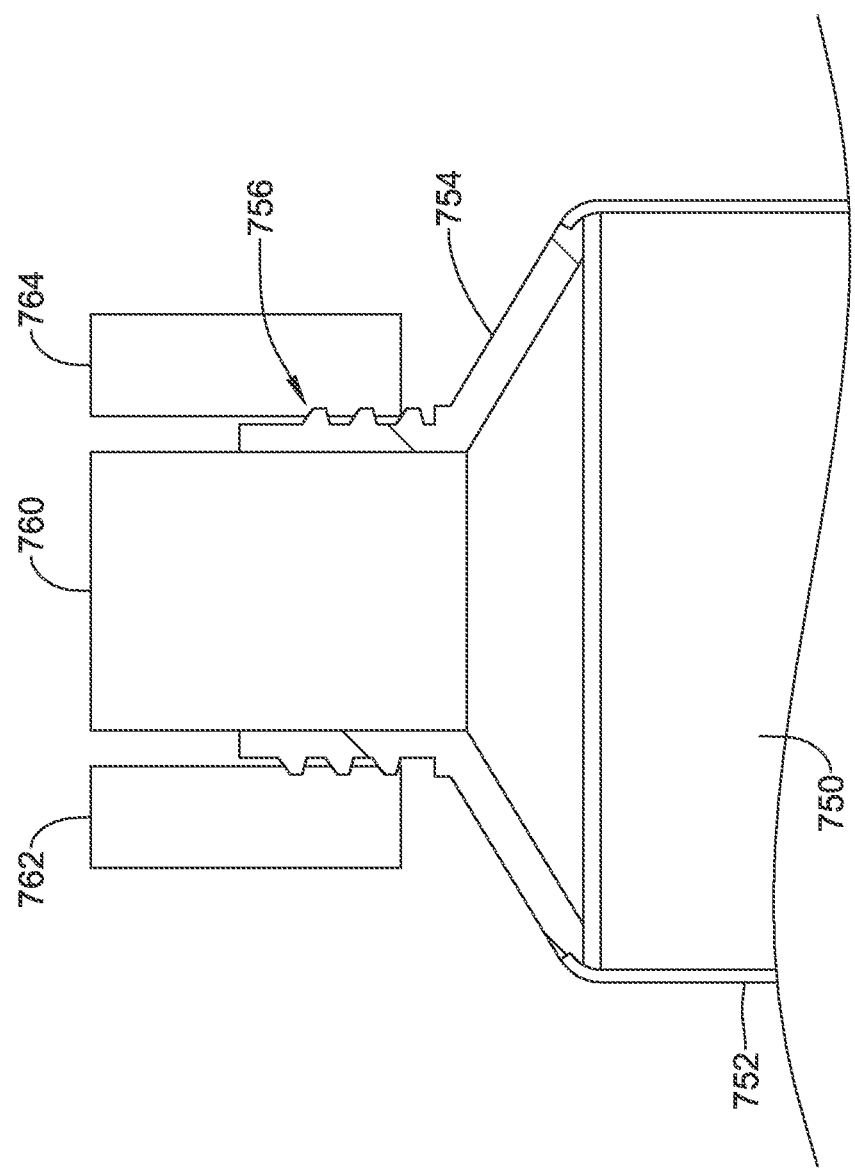
Figure 14E:
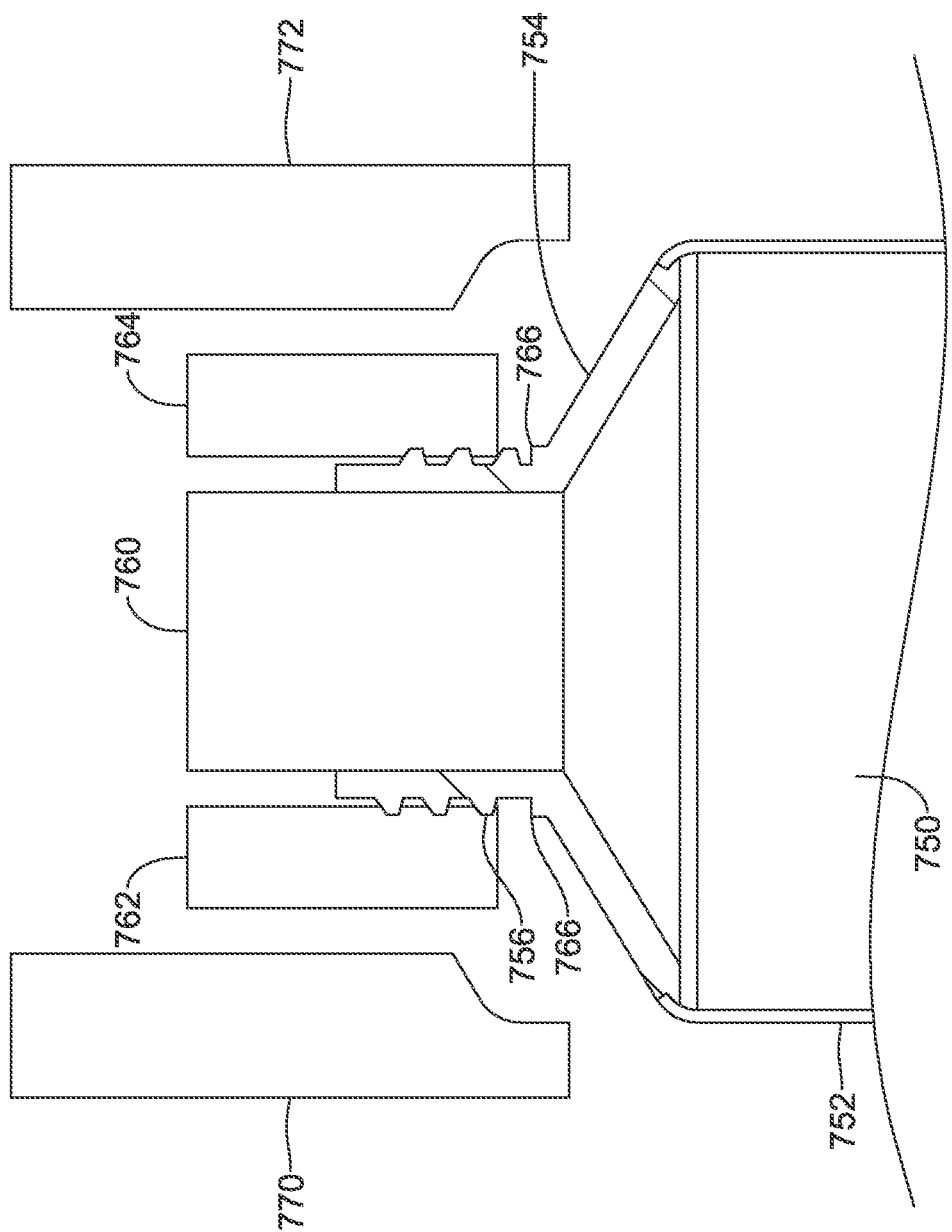
Figure 14F:
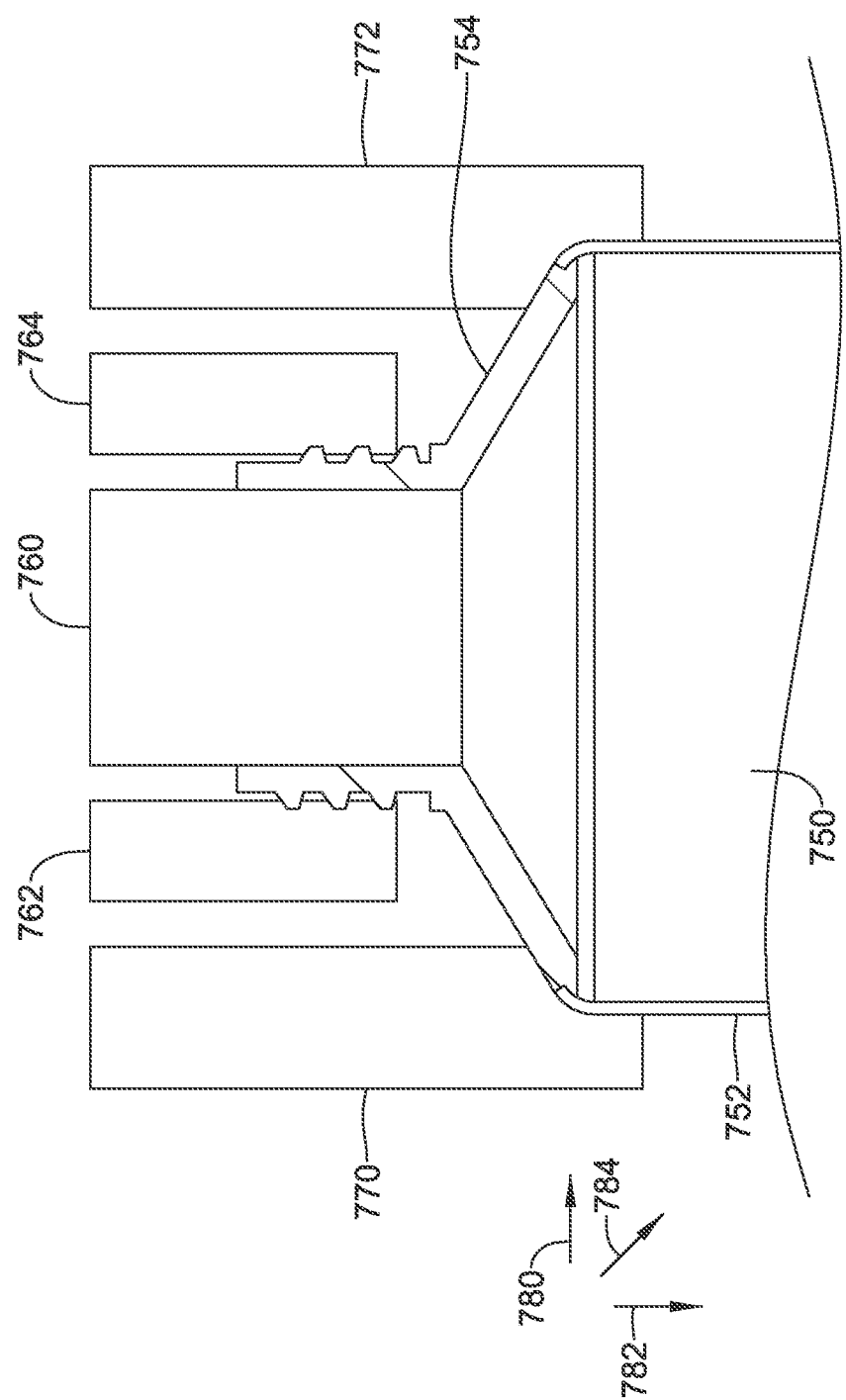

FIGS. 14D-14F show another alternative approach to securing a neck piece on a thin-walled tube. In FIG. 14D, a container 750 is to be made with a thin-walled tube and a neck piece 754. The neck piece 754 having threads 756 has inserted therein a mandrel shown at 760. A holding fixture, shown at 762/764, is then advanced down and/or laterally to the positioning shown in FIG. 14D. The holding fixture is shown having at least two parts, but may be a single, cylindrical piece, if desired, which would be advanced in telescoping manner around the mandrel 760.

As shown in FIG. 14E, a set of ribbed protrusions are then extended from the holding fixture 762/764 to engage the threads 756, as shown at 766. With the neck piece 754 thus secured, a welding fixture is brought into view as shown at 770/772. If desired the welding fixture may be a cylindrical element moved in telescoping fashion over and about the mandrel 760 and holding fixture 762/764. As shown in FIG. 14F, the welding fixture 770/772 is then placed against the location where the thin-walled tube 752 and neck piece 754 overlap, with the thin-walled tube placed over the outermost portion of the neck piece 754. Pressure may be applied in a lateral direction 780, vertical direction 782, and/or diagonally as indicated at 784 as welding energy is applied. Thus here, the holding fixture 762/764 is used to secure the neck piece 754 against the pressure applied by the welding fixture 770/772. Moreover, the entire set of mandrel 760 and fixtures 762/764 and 770/772 can be advanced and retracted from a singled direction, making for a compact fixture assembly.

The fixtures shown and described in FIGS. 11A-11C, 12A-12C, 13A-13B, and 14A-14F may alternatively be referred to as sealing tools, if desired.

Figure 16:
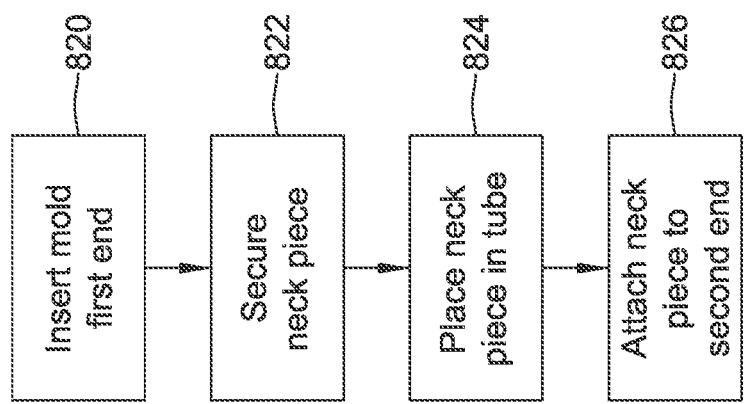
FIGS. 15 and 16 show, in block diagrams, illustrative manufacturing methods.
Figure 15:
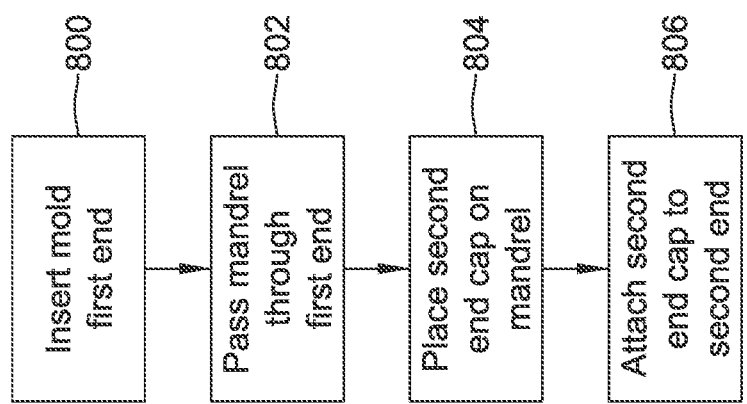

FIGS. 15 and 16 show, in block diagrams, illustrative manufacturing methods. Starting in FIG. 15, at block 800, a first end of a thin-walled tube has an insert molding step performed, thereby using an integral process to create the first end of the container. As noted above, various alternatives may use assembly instead, by attaching a pre-made piece to the thin-walled tube at a first end thereof, rather than forming it instead using insert molding. A mandrel is then passed through the first end, which usually will require passing the mandrel through an opening in a neck piece, as indicated at 802. The end cap for the second end of the thin-walled tube can then be placed on the mandrel, as indicated at 804. Finally, the end cap for the second end of the thin-walled tube is attached, usually by welding (heat, sonic, laser, steam, plasma, for example), as indicated at 806. The example of FIG. 15 generally encompasses most of the above examples with the exception of FIGS. 14A-14F, with various additional details shown above.

FIG. 16 shows an alternative. Here, the first end of a thin-walled tube has an insert molding step performed, using an integral process to create the first end of the container. As noted above, various alternatives may use assembly instead, by attaching a pre-made piece to the thin-walled tube at a first end thereof, rather than forming it instead using insert molding. A neck piece is then secured as indicated at 822, and either before or after the neck piece is inserted into the second end of the thin-walled tube, as indicated at 824. Finally, the neck piece is attached to the second end of the thin-walled tube, as indicated at 826, such as by welding (heat, sonic, laser, steam, plasma, for example). The example of FIG. 16 corresponds generally to the examples shown in FIGS. 14A-F, with various additional details shown above.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects. Method examples described herein can be machine or computer-implemented at least in part. Some examples can include a computer-readable medium or machine-readable medium encoded with instructions operable to configure an electronic device, such as a manufacturing system, fixture or plurality of fixtures, to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of manufacturing a container using a thin-walled tube having a first open end and a second open end for said container, the method comprising:

extruding the thin-walled tube with one or more layers;

attaching a first structure on the first open end of the thin-walled tube, the first structure including a receiving portion for receiving a cap, and an aperture for dispensing a product, the aperture having an inner diameter smaller than an inner diameter of the thin-walled tube;

after attaching the first structure, inserting an end of a mandrel from outside the thin-walled tube through the aperture and into an interior of the thin-walled tube;

placing an end cap piece against the end of the mandrel such that at least a portion of the end cap piece is surrounded by the thin-walled tube;

resting the receiving portion on the mandrel; and securing the second open end of the thin-walled tube to the end cap piece by placing a weld fixture over an outer surface of both the end cap and the second open end of the thin-walled tube, and applying energy to a junction between the thin-walled tube and the end cap piece.

2. The method of claim 1 wherein the extruding step includes extruding the thin-walled tube with at least two layers.

3. The method of claim 1 wherein the extruding step includes extruding the thin-walled tube with at least three layers.

4. The method of claim 1 wherein the mandrel has a central axis and is passed through the aperture in the direction of the central axis in the inserting step, and further the weld fixture is placed by movement along the central axis of the mandrel.

5. The method of claim 1 wherein the mandrel has a central axis and is passed through the aperture in the direction of the central axis in the inserting step, and further the weld fixture is a multiple-piece fixture placed by movement perpendicular to the central axis.

6. The method of claim 1 wherein the mandrel has a central axis and is passed through the aperture in the direction of the central axis in the inserting step, and further the weld fixture is operated for welding by rotation at least partly about the central axis while in contact with at least one of the thin-walled tube or the end cap piece.

7. The method of claim 1 wherein the end cap piece has an outer wall against which the thin-walled tube is placed for welding, and the outer wall defines a receiving area with a ridge determining the end of the receiving area.

8. The method of claim 1 wherein the end cap piece has an outer wall against which the thin-walled tube is placed for welding, and is formed with a reinforcing ring made of a first material, and a molded piece surrounding the reinforcing ring made of a second material.

9. The method of claim 1 wherein the end cap piece has an outer wall against which the thin-walled tube is placed for welding, a first section of the outer wall being made of a first piece of a first material, and a second section of the outer wall being made of a second piece of a second material.

10. The method of claim 1 wherein the thin-walled tube comprises at least a portion made of a heat shrink material.

11. A method of manufacturing a container using a thin-walled tube having a first open end and a second open end for said container, the method comprising:
    extruding the thin-walled tube with one or more layers;
    attaching a first structure on the first open end of the thin-walled tube, the first structure including a receiving portion for receiving a cap, and an aperture for dispensing a product, the aperture having an inner diameter smaller than an inner diameter of the thin-walled tube;
    after attaching the first structure, inserting an end of a mandrel from outside the thin-walled tube through the aperture and into an interior of the thin-walled tube;
    placing an end cap piece against the end of the mandrel such that at least a portion of the end cap piece is surrounded by the thin-walled tube; and
    securing the second open end of the thin-walled tube to the end cap piece by placing a weld fixture over an outer surface of both the end cap and the second open end of the thin-walled tube, and applying energy to a junction between the thin-walled tube and the end cap piece;
    wherein the end cap piece has a slot configured for securely receiving the mandrel therein.

12. The method of claim 11, further comprising resting the receiving portion on the mandrel.

\* \* \* \* \*